(12) United States Patent
Katoh et al.

(10) Patent No.: US 11,444,552 B2
(45) Date of Patent: Sep. 13, 2022

(54) ELECTRIC POWER CONVERTING DEVICE, AND ELECTRICITY GENERATING SYSTEM

(71) Applicant: TOHOKU UNIVERSITY, Miyagi (JP)

(72) Inventors: Shuji Katoh, Miyagi (JP); Yoshikazu Takahashi, Miyagi (JP); Tetsuo Endoh, Miyagi (JP)

(73) Assignee: TOHOKU UNIVERSITY, Miyagi (JP)

( * ) Notice: Subject to any disclaimer, the term of this patent is extended or adjusted under 35 U.S.C. 154(b) by 0 days.

(21) Appl. No.: 17/598,629

(22) PCT Filed: Mar. 30, 2020

(86) PCT No.: PCT/JP2020/014703
§ 371 (c)(1),
(2) Date: Sep. 27, 2021

(87) PCT Pub. No.: WO2020/204010
PCT Pub. Date: Oct. 8, 2020

(65) Prior Publication Data
US 2022/0190741 A1      Jun. 16, 2022

(30) Foreign Application Priority Data

Mar. 29, 2019   (JP) .............................. JP2019-067353

(51) Int. Cl.
*H02M 7/538*     (2007.01)
*H02M 7/5387*    (2007.01)
(Continued)

(52) U.S. Cl.
CPC ......... *H02M 7/53871* (2013.01); *H02M 1/14* (2013.01); *H02M 7/48* (2013.01);
(Continued)

(58) Field of Classification Search
CPC .. H02M 7/53871; H02M 1/14; H02M 7/5387; H02M 7/5395; H02M 1/32
See application file for complete search history.

(56) References Cited

U.S. PATENT DOCUMENTS 4,891,744 A * 1/1990 Yamamoto .............. H02M 1/14
                                                        363/37
6,362,593 B1 * 3/2002 Lee .......................... H02P 27/08
                                                        318/722
(Continued)

FOREIGN PATENT DOCUMENTS

JP        200126798 A     1/2001
JP       2001268798 A     9/2001
(Continued)

OTHER PUBLICATIONS

Extended European Search Report issued in European Patent Application No. 20782339.4 dated Apr. 12, 2022.
(Continued)

*Primary Examiner* — Yusef A Ahmed
(74) *Attorney, Agent, or Firm* — Fox Rothschild LLP; Robert J. Sacco; Carol Thorstad-Forsyth

(57) ABSTRACT

The present invention provides an electric power conversion device and an electric power generation system which are capable of suppressing ripples in a detected voltage and detection delay.

39 Claims, 12 Drawing Sheets

(51) Int. Cl.
*H02M 1/14* (2006.01)
*H02M 7/48* (2007.01)
*H02M 7/539* (2006.01)
*H02M 7/5395* (2006.01)
*H02M 7/537* (2006.01)
*H02M 1/32* (2007.01)

(52) U.S. Cl.
CPC .......... *H02M 7/537* (2013.01); *H02M 7/539* (2013.01); *H02M 7/5387* (2013.01); *H02M 7/5395* (2013.01); *H02M 1/32* (2013.01)

(56) References Cited

U.S. PATENT DOCUMENTS

| | | | | |
|---|---|---|---|---|
| 6,407,536 | B1* | 6/2002 | Ogusa | H02M 7/1626 323/207 |
| 2005/0135031 | A1* | 6/2005 | Colby | H02M 7/5395 361/78 |
| 2007/0241720 | A1* | 10/2007 | Sakamoto | H02P 27/08 318/811 |
| 2009/0160377 | A1* | 6/2009 | Yamada | H02M 7/53871 318/400.02 |
| 2009/0168474 | A1* | 7/2009 | Katoh | H02J 3/01 363/78 |
| 2010/0052599 | A1* | 3/2010 | Nagai | H02P 21/28 318/766 |
| 2011/0031920 | A1* | 2/2011 | Henderson | H02P 21/0089 318/434 |
| 2011/0175557 | A1* | 7/2011 | Iwashita | H02P 23/06 318/400.3 |
| 2012/0025845 | A1* | 2/2012 | Carrobe | B41J 2/04541 324/705 |
| 2012/0170333 | A1* | 7/2012 | Bando | H02M 7/5395 363/56.01 |
| 2012/0212191 | A1* | 8/2012 | Yuzurihara | H02M 3/1584 323/205 |
| 2014/0078796 | A1* | 3/2014 | Inoue | H02M 7/2173 363/68 |
| 2014/0092657 | A1* | 4/2014 | Fujii | H02J 3/381 363/79 |
| 2015/0256117 | A1* | 9/2015 | Suzuki | H02P 27/085 62/160 |
| 2015/0270788 | A1* | 9/2015 | Sawano | H02M 7/48 363/98 |
| 2015/0280612 | A1* | 10/2015 | Ide | H02M 7/53871 363/98 |
| 2016/0336874 | A1* | 11/2016 | Kikuchi | H02M 7/483 |
| 2017/0047860 | A1* | 2/2017 | Fujii | H02M 7/4833 |
| 2017/0207698 | A1* | 7/2017 | Kuboyama | H02M 7/53875 |
| 2017/0214337 | A1 | 7/2017 | Baronian et al. | |
| 2018/0358907 | A1* | 12/2018 | Kato | H02M 7/53871 |
| 2019/0058411 | A1* | 2/2019 | Kitamoto | H02M 1/15 |
| 2021/0028625 | A1* | 1/2021 | Inoue | H02J 3/32 |
| 2021/0175818 | A1* | 6/2021 | Murai | H02M 7/219 |

FOREIGN PATENT DOCUMENTS

| | | |
|---|---|---|
| JP | 2009219238 A | 9/2009 |
| JP | 4373040 B2 | 11/2009 |
| JP | 2017046501 A | 3/2017 |
| WO | 2016051500 A1 | 4/2016 |

OTHER PUBLICATIONS

International Search Report and Written opinion issued in PCT/JP2020/014703 dated Jun. 23, 2020.

* cited by examiner

EXAMPLE

COMPARATIVE EXAMPLE

ELECTRIC POWER CONVERTING DEVICE, AND ELECTRICITY GENERATING SYSTEM

The present application is a U.S. National Phase of International Patent Application No. PCT/JP2020/014703, filed Mar. 30, 2020, which claims the benefit and priority of Japanese Patent Application No. JP2019-067353 which was filed on Mar. 29, 2019. The entirety of these applications are incorporated herein by reference.

TECHNICAL FIELD

The present invention relates to an electric power conversion device and an electric power generation system.

BACKGROUND ART

Wind power, solar power, and the like have attracted attention as renewable energy. In a power-generating device that generates power by using the wind power or the solar power, generated DC power is converted into AC power by using an electric power conversion device called a power conditioner, and the converted AC power is output to a power system. For example, an electric power conversion device for solar power generation is provided with a converter, generated DC power is supplied to a DC part of the electric power conversion device, and the DC voltage is shaped to a predetermined AC waveform in the converter. At this time, the converter connected to a system through impedance controls the output voltage so that a predetermined differential voltage is generated between a system voltage and the output voltage of the electric power conversion device, and thus active power generated by the power-generating device can be supplied to the power system.

In such an electric power conversion device, when a phase of the power system varies due to a system accident or the like, there is a concern that the differential voltage from the output voltage of the electric power conversion device increases, and an overcurrent flows to the electric power conversion device, thereby resulting in failure. Accordingly, in order to cause the electric power conversion device to operate for a long period of time without failure, some measures such as a measure of promptly detaching the electric power conversion device from the power system when the system accident occurs are necessary.

For example, Patent Literature 1 discloses an electric power conversion device that detects a voltage of the power system, determines whether or not system accident is accident that requires protective stoppage on the basis of the detected voltage of the power system, and stops an operation when determination is made as the protective stoppage.

CITATION LIST

Patent Literature

PTL 1: JP-A-2001-268798

SUMMARY OF INVENTION

Technical Problem

A typical electric power conversion device outputs a pulse voltage or a voltage obtained by combining pulse voltages. Accordingly, vibration components (also referred to as "ripples") are superimposed on an output of the electric power conversion device. As a result, the ripples are also superimposed on the power system. In the case of detecting the interconnection point voltage between the power system and a power converter, or the like, and utilizing the interconnection point voltage or the like in power converter control, it is preferable to remove ripple components from a detected value. For example, a first-order lag low-pass filter is provided in the electric power conversion device, and an output of a voltage detector that detects the interconnection point voltage is caused to pass through the filter. According to this, the ripples in the output of the voltage detector can be removed. In this case, when a time constant of the low-pass filter is set to be small, an output of the low-pass filter, that is, a detection delay that occurs in the detected voltage is small, but the ripples remain in the detected voltage. On the other hand, when the time constant of the low-pass filter is set to be large, the ripples in the detected voltage become small, but the detection delay becomes large.

Accordingly, in the case of using the first-order lag low-pass filter, when the time constant is set to be small, the detection delay can be decreased, but the ripples cannot be removed. When the time constant is set to be large, the ripples can be removed, but the detection delay becomes large. Patent Literature 1 does not imply removal of the ripples in the detected voltage. Therefore, even when the time constant is set to be large and a voltage command of the electric power conversion device is set to zero, there is a concern that a current flows from the electric power conversion device, or in a case where a phase of a system voltage is greatly converted, it is difficult to follow a rapid voltage variation, and an overcurrent may flow. In addition, when the time constant is set to be small, there is a concern that the ripples are not removed, and whether or not to stop the electric power conversion device may be erroneously detected due to the ripples. In this manner, in a method using the first-order lag low-pass filter, there are concerns on the overcurrent or malfunction depending on setting of the time constant, and thus there is a demand for an electric power conversion device capable of suppressing the detection delay of the detected voltage and the ripples.

Here, the invention has been made in consideration of the above-described problems, and an object thereof is to provide an electric power conversion device and an electronic power generation system which are capable of suppressing ripples in a detected voltage and detection delay.

Solution to Problem

According to an aspect of the invention, there is provided an electric power conversion device connected to a power system through interconnection impedance. The electric power conversion device includes: a converter of which a switch is switched at a predetermined switching cycle, and which outputs power to the power system through the interconnection impedance; a voltage detector that detects an interconnection point voltage between the electric power conversion device and the power system; and a control device that controls the converter on the basis of a moving average of an output voltage of the voltage detector over a predetermined period in correspondence with the switching cycle.

According to another aspect of the invention, there is provided an electric power conversion device connected to a system functioning as an AC voltage source through interconnection impedance. The electric power conversion device includes: a converter that includes a switch that is switched to output pulses of different widths at approximately constant cycles, and outputs a predetermined AC voltage; a voltage detector that detects a system voltage of the system; and a control device that controls the converter. The voltage detector includes a detection unit that detects a voltage value at a predetermined point of the system to which the converter is connected, and a filtering unit that moving-averages an output voltage of the detection unit or calculates an approximate value of a moving average of the output voltage over a period of one cycle or several cycles of constant cycles.

According to still another aspect of the invention, there is provided an electric power conversion device connected to a power system through interconnection impedance. The electric power conversion device includes: a converter that outputs a predetermined AC voltage; a system voltage detection device that detects a system voltage of the power system; and a control device that controls the converter by pulse width modulation control. The system voltage detection device detects the system voltage by calculating a moving average over a period of one cycle or several cycles of a carrier wave used in the pulse width modulation control with respect to a detected voltage, and the control device has a function of calculating a voltage command value of the converter on the basis of the system voltage calculated by moving-averaging.

According to still another aspect of the invention, there is provided an electronic power generation system including the electric power conversion device.

Advantageous Effects of Invention

According to the invention, ripples in a detected voltage and detection delay can be suppressed. Particularly, a voltage is detected by calculating a moving average over a period of one cycle of a carrier wave used in pulse width modulation control, and thus ripples and detection delay can be further suppressed.

In addition, since a voltage is detected by calculating a moving average over a period of several cycles of a carrier wave used in pulse width modulation control, ripples and detection delay can be further suppressed.

BRIEF DESCRIPTION OF DRAWINGS

DESCRIPTION OF EMBODIMENTS (1) First Embodiment (1-1) Overall Configuration of Electronic Power Generation System Including Electric Power Conversion Device According to First Embodiment of Invention In the first embodiment, description will be given of an electric power conversion device according to a first embodiment with reference to the case of use in an power generation system. First, a configuration of the power generation system will be described. As illustrated in FIG. 1, an power generation system 100 is interconnected to an AC voltage source 55 (an infinite bus-bar of a three-phase alternating current) through a power system 50. The power system 50 is a system that functions as an AC voltage source. The power generation system 100 includes an active power source 15 and an electric power conversion device 10, and the active power source 15 is connected to the electric power conversion device 10 by a DC wiring. The active power source 15 is a power-generating device such as a wind power generation device and a solar power generation device. The electric power conversion device 10 is interconnected to respective phases of the power system 50 by terminals LPR, LPS, and LPT (hereinafter, also referred to as "interconnection point") through reactors 17R, 17S, and 17T as interconnection impedance. A configuration of the electric power conversion device 10 will be described later. Note that, in this embodiment, it is assumed that an AC voltage frequency in the AC voltage source 55 and the power system 50 is 50 Hz.

Figure 1:
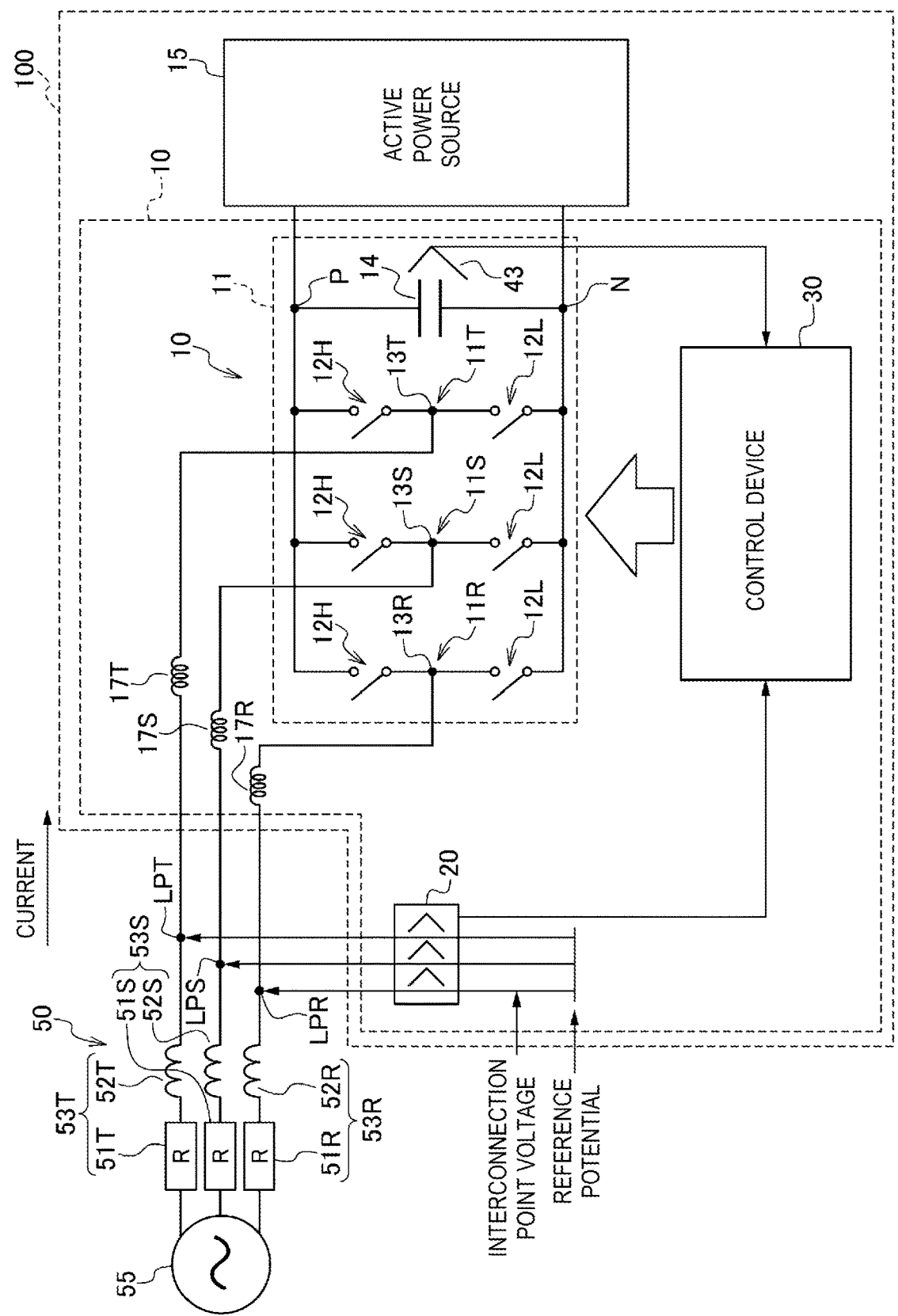
FIG. 1 is a schematic view illustrating an example of an electronic power generation system including an electric power conversion device according to a first embodiment of the invention.

An operation of the power generation system 100 will be described. In the power generation system 100, the active power source 15 generates DC power, and outputs the DC voltage to the electric power conversion device 10. The power generation system 100 may generate power at an alternating current and convert the alternating current into a direct current as in wind power generation, or may be a battery system that transmits and receives power. In the former case, as the active power source 15, the wind power generation device is connected to the electric power conversion device 10 through AC-DC. In the latter case, as the active power source 15, for example, a battery such as a secondary battery capable of being charged and discharged is connected to the electric power conversion device 10. In this manner, the active power source 15 supplies active power to the electric power conversion device 10.

The electric power conversion device 10 converts a DC voltage supplied from the active power source 15 into an AC voltage, and outputs the converted AC voltage to the power system 50. According to this, the electric power conversion device 10 transmits or receives active power or reactive power to and from the AC voltage source 55 through the power system 50. In addition, the power system 50 is constituted by an electric wire and the like, and actually has an impedance component. Accordingly, in FIG. 1, impedance components 53R, 53S, and 53T of respective phases of the power system 50 are expressed as resistance components 51R, 51S, and 51T, and reactance components 52R, 52S, and 52T.

(1-2) Configuration of Electric Power Conversion Device According to First Embodiment of Invention Next, a configuration of the electric power conversion device 10 will be described. As illustrated in FIG. 1, the electric power conversion device 10 includes a converter 11, reactors 17R, 17S, and 17T, an interconnection point voltage detection device 20, a control device 30, and a capacitor voltage detector 43. A configuration of the control device 30 will be described later.

First, a configuration of the converter 11 will be described. The converter 11 is a converter having a three-phase full-bridge circuit configuration. The converter includes an R-phase conversion part 11R, an S-phase conversion part 11S, a T-phase conversion part 11T, a capacitor (DC capacitor) 14, a positive side input terminal P, and a negative side input terminal N. The converter 11 has a configuration in which the R-phase conversion part 11R, the S-phase conversion part 11S, the T-phase conversion part 11T, and the capacitor 14 are connected in parallel between the positive side input terminal P and the negative side input terminal N. The active power source 15 is connected to the positive side input terminal P and the negative side input terminal N of the converter 11. The capacitor 14 is a DC capacitor, and a rated voltage of the capacitor 14 is appropriately selected on the basis of the magnitude of active power or reactive power that is desired to output.

In the R-phase conversion part 11R, the S-phase conversion part 11S, and the T-phase conversion part 11T, a high side switch 12H and a low side switch 12L are connected in series, the high side switch 12H side is connected to the positive side input terminal P, and the low side switch 12L side is connected to the negative side input terminal N. In the R-phase conversion part 11R, an output terminal 13R is provided at a connection point between the high side switch 12H and the low side switch 12L. In the S-phase conversion part 11S, an output terminal 13S is provided at a connection point between the high side switch 12H and the low side switch 12L. In the T-phase conversion part 11T, an output terminal 13T is provided at a connection point between the high side switch 12H and the low side switch 12L.

In the electric power conversion device 10, the output terminal 13R of the R-phase conversion part 11R is connected to a u-phase of the power system 50 through the reactor 17R and a terminal LPR, the output terminal 13S of the S-phase conversion part 11S is connected to a v-phase of the power system 50 through the reactor 17S and a terminal LPS, and the output terminal 13T of the T-phase conversion part 11T is connected to a w-phase of the power system 50 through the reactor 17T and a terminal LPT. According to this, the electric power conversion device 10 is interconnected to the power system 50.

The high side switch 12H and the low side switch 12L are constituted by, for example, a switching element constituted by an IGBT or the like, and a freewheeling diode. In the first embodiment, the high side switch 12H and the low side switch 12L have a configuration in which the switching element and the free wheeling diode are connected in anti-parallel. Specifically, a positive side of the switching element (a collector of the IGBT) and a negative side of the free wheeling diode are connected, and a negative side of the switching element (an emitter of the IGBT) and a positive side of the free wheeling diode are connected.

In this manner, in the high side switch 12H and the low side switch 12L, since the switching element and the free wheeling diode are connected in anti-parallel, when a voltage is applied from a negative side to a positive side of the high side switch 12H and the low side switch 12L, a current is allowed to flow to the free wheeling diode, and a current is prevented from flowing from the emitter to the collector of the IGBT that is the switching element, thereby protecting the IGBT. In addition, for example, the high side switch 12H and the low side switch 12L may be constituted by a switching element such as a metal oxide semiconductor field effect transistor (MOS-FET: a MOS type field effect transistor) of silicon carbide (SiC), a field effect transistor (FET) formed from gallium nitride (GaN), and an FET formed from GaN formed on silicon (Si). The switches are switched to output pulses having widths different from each other at an approximately constant cycle.

Figure 2A:
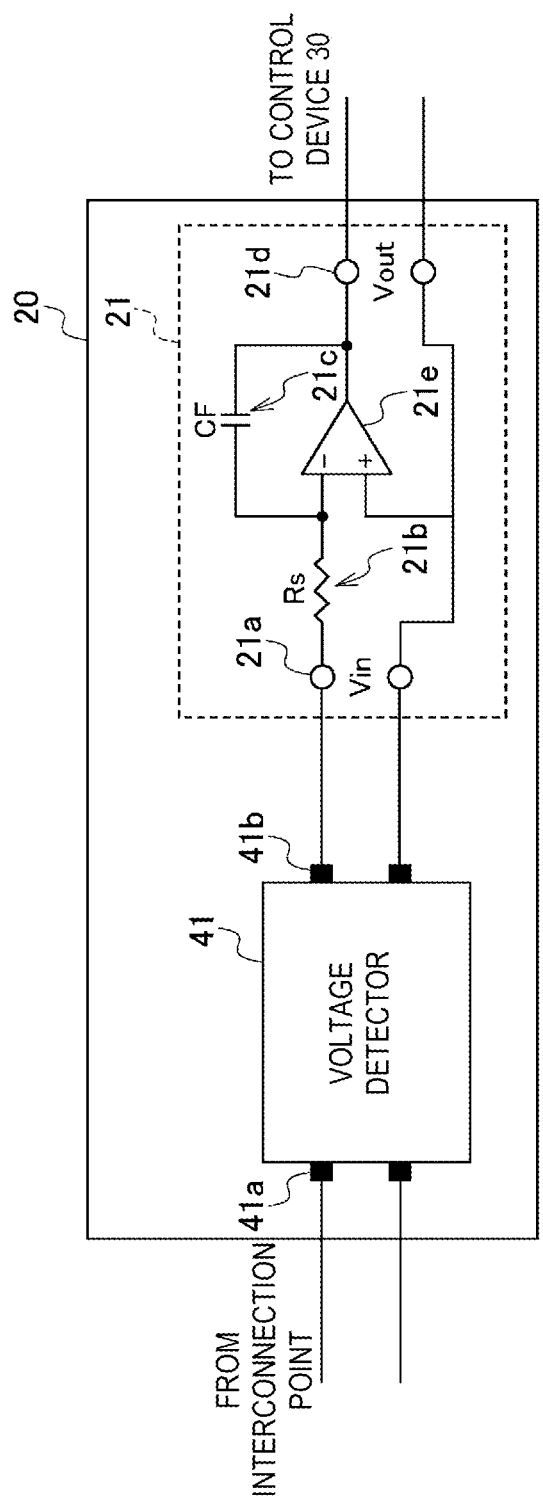
FIG. 2A is a schematic view illustrating a configuration of an interconnection point voltage detection device according to analog operation.

Next, a configuration of the interconnection point voltage detection device 20 as a system voltage detection device will be described with reference to FIG. 2A. As illustrated in FIG. 2A, the interconnection point voltage detection device 20 includes a voltage detector (detection unit) 41 and a filtering unit 21. The interconnection point voltage detection device 20 detects a voltage of each phase of the power system 50 with the voltage detector 41, and moving-averages the voltage of the phase which is detected with the filtering unit 21 over a predetermined period for every phase, and outputs the moving-averaged voltage to the control device 30 as a system voltage of each phase. Hereinafter, a configuration of each part of the interconnection point voltage detection device 20 will be described.

The voltage detector 41 is provided at a predetermined site of the power system 50 and detects a voltage at the predetermined site. In this embodiment, the voltage detector 41 includes an R-phase detection part, an S-phase detection part, and a T-phase detection part (not illustrated in FIG. 2A), and the R-phase detection part, the S-phase detection part, and the T-phase detection part are respectively connected to interconnection points with an R-phase, an S-phase, and a T-phase of the electric power conversion device 10, and the u-phase, the v-phase, and the w-phase of the power system 50 through a measurement terminal 41a. The measurement terminal 41a is constituted by two terminals, and one terminal is connected to an interconnection point, and the other terminal is connected to a reference potential. The measurement terminal 41a is provided in respective phases one by one. However, in FIG. 2A, only one measurement terminal 41a is illustrated for convenience. In the voltage detector 41, the R-phase detection part, the S-phase detection part, and the T-phase detection part detect potentials of the terminals LPR, LPS, and LPT (hereinafter, also referred to as "interconnection point") with a reference potential set as a reference. In this manner, the voltage detector 41 detects a voltage of the interconnection point. The voltage detected by the voltage detector 41 is a voltage with an AC neutral point set as a reference potential, and corresponds to a phase voltage of each phase of the power system 50. The voltage detection is not limited to the aforementioned, a line voltage may be detected.

The filtering unit 21 performs moving-averaging of an output of the voltage detector 41 so as to remove ripple components in accordance with switching of the converter 11. The moving-averaging may be performed by only the filtering unit 21, or may be performed in combination with the control device 30 at a rear stage. In addition, the filtering unit 21 may calculates an approximate value of a moving-average. For example, the approximate value represents an error-including value such as a case where some error (for example, ±3%) is included because a window (period) of moving-average is not an integral multiple of an operation period of the control device. Even in this case, operation performance slightly deteriorates, but it is possible to operate the electric power conversion device.

In a case where each switching of the converter 11 is driven by pulse width modulation (PWM) control of a triangular wave comparison system, as the simplest means for realizing the filtering unit 21, it is preferable to integrate an output of the voltage detector 41 by an analog circuit. For example, as illustrated in FIG. 2A, a moving average can be calculated by performing integration by an integration circuit using an operational amplifier, or the like. The filtering unit 21 illustrated in FIG. 2A is constituted by two-terminal input terminal 21a, a resistor 21b, a capacitor 21c, a two-terminal output terminal 21d, and an operational amplifier 21e. One side of the input terminal 21a is connected to a negative terminal of the operational amplifier 21e through the resistor 21b, and the other side of the input terminal 21a is connected to a positive terminal of the operational amplifier 21e and one side of the output terminal 21d. An output of the operational amplifier 21e is connected to the other side of the output terminal 21d, and is feedback to the negative terminal of the operational amplifier through the capacitor 21c. In this manner, the filtering unit 21 is constituted by an integration circuit, and calculates the moving average by integrating a detected voltage. The filtering unit 21 includes the integration circuit one by one for every phase. However, in FIG. 2A, only one piece is illustrated for convenience. Note that, a resistance value of the resistor 21b, a capacitance value of the capacitor 21c, a gain of the operational amplifier 21e, and the like may be appropriately set in consideration of a frequency of ripples, and the like.

Next, a capacitor voltage detector 43 will be described. The capacitor voltage detector 43 is connected to both ends of the capacitor 14 and detects a capacitor voltage of the capacitor 14. The capacitor voltage detector 43 outputs a detection result to the control device 30.

(1-3) Operation of Electric Power Conversion Device According to First Embodiment of Invention Next, an operation of the electric power conversion device 10 will be described. The electric power conversion device 10 outputs a sum voltage of a voltage component output by feed forward of an interconnection point voltage V, a voltage component output on the basis of an active power component voltage command value, and a voltage component output on the basis of a reactive power component voltage command value. The operation of the electric power conversion device 10 is the same for the R-phase, the S-phase, and the T-phase, and thus description will be made by using the R-phase as a representative. First, an operation of the converter 11 will be described. In the converter 11 illustrated in FIG. 1, a gate pulse signal is input to the high side switch 12H and the low side switch 12L of the R-phase conversion part 11R from a gate pulse generation unit 37 (refer to FIG. 3). Specifically, for example, a predetermined voltage is input to a gate of the IGBT that constitutes the high side switch 12H and the low side switch 12L.

When a gate pulse signal for turning on a switch is input to the high side switch 12H, and a gate pulse signal for turning off a switch is input to the low side switch 12L, the R-phase conversion part 11R outputs a positive capacitor voltage to the output terminal 13R of the R-phase conversion part 11R. On the other hand, when a gate pulse signal for turning off the switch is input to the high side switch 12H, and a gate pulse signal for turning on the switch is input to the low side switch 12L, the R-phase conversion part 11R outputs a negative capacitor voltage to the output terminal 13R of the R-phase conversion part 11R. In this manner, since the converter 11 can switch ON and OFF of the high side switch 12H and the low side switch 12L of the R-phase conversion part 11R, the converter 11 converts a DC voltage of the capacitor 14 into an AC voltage, and outputs the AC voltage to the u-phase of the power system 50. The respective phases of the converter 11 are controlled to output an AC voltage of which phases shifts from each other by 120° to the power system 50 by the same method, thereby outputting a three-phase AC voltage.

Note that, a configuration of the converter 11 is not particularly limited as long as an input DC voltage can be converted into a three-phase AC voltage and can be output to the power system, and may be a multi-level converter such as a modular multilevel converter (MMC) or a three-level converter capable of outputting a predetermined three-level voltage, particularly, a so-called NPC three-level converter.

Next, an operation of the interconnection point voltage detection device 20 will be described. The interconnection point voltage detection device (voltage detection device) 20 detects a system voltage of a system functioning as an AC voltage source. Specifically, the interconnection point voltage detection device 20 detects a voltage of an interconnection point, that is, an interconnection point voltage V as a system voltage of the power system 50. The voltage detector 41 detects voltages of the interconnection points LPR, LPS, and LPT of respective phases, and outputs detected voltages of the respective phases from a detection terminal 41b to the filtering unit 21. The filtering unit 21 integrates the detected voltages of the respective phases which are input from the input terminal 21a for every phase by an integration circuit. The filtering unit 21 calculates a moving average by time-integrating the detected voltages. The filtering unit 21 outputs a result of moving-averaging from the output terminal 21d to the control device 30 as the interconnection point voltage V of each phase. In this manner, the voltage of the interconnection point of each phase is detected, and a detected voltage is moving-averaged by time-integration. Accordingly, the interconnection point voltage V of each phase is detected. The filtering unit 21 moving-averages the output voltage of the voltage detector 41 over a predetermined period, thereby filtering the interconnection point voltage V.

Then, in the first embodiment, the control device 30 takes a difference between a current value of the detected interconnection point voltage V (a result of moving-averaging) and a past value of the interconnection point voltage V detected before a period of one cycle of a triangular wave (carrier wave) of the PMW, and appropriately adjusts the magnitude of the difference value (gain adjustment). By taking the difference between the current value and the past value of the interconnection point voltage V, a period between a point of time at which the past value is detected and the current time corresponds to a period of moving-averaging, and the difference value becomes an average value of the interconnection point voltage V detected over the period. In this manner, in the first embodiment, the moving average is calculated over a period of one cycle (one cycle of constant cycles) of a carrier wave that is used for pulse width control and is a wave fluctuates at constant cycles. Note that, the work may be carried out by the interconnection point voltage detection device 20 and the difference value may be output as the interconnection point voltage V.

Figure 2B:
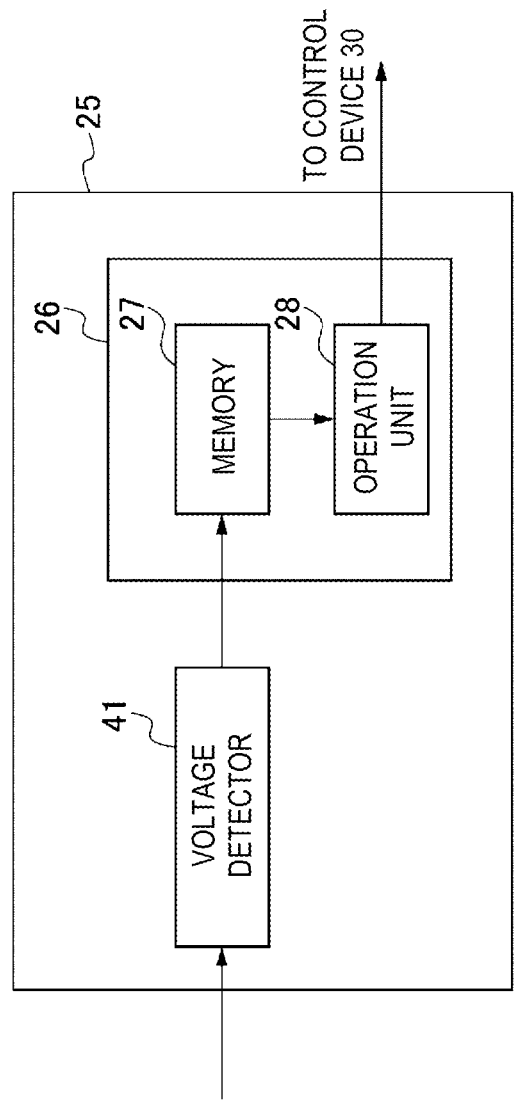
FIG. 2B is a schematic view illustrating a configuration of an interconnection point voltage detection device according to digital operation.

In addition, the moving average can be obtained by the following digital operation instead of the analog operation. In this case, an interconnection point voltage detection device 25 illustrated in FIG. 2B is used. The interconnection point voltage detection device 25 includes the voltage detector 41 and a filtering unit 26. A configuration of the voltage detector 41 is the same as described above, and thus description thereof will be omitted. The filtering unit 26 is constituted by a memory 27 and an operation unit 28, and performs filtering by moving-averaging an output voltage of the voltage detector 41 over a predetermined period. The memory 27 stores a detected voltage of each phase which is detected by the voltage detector 41 for a predetermined period. For example, the memory 27 is a known storage device such as a DRAM, an SRAM, a flash memory, and a hard disk drive. The operation unit 28 calculates an average value of the detected voltage which is stored by the memory 27 for every phase, and outputs the calculation result to the control device 30 as the interconnection point voltage V of each phase. The operation unit 28 may be dedicated hardware that calculates the average value of the detected voltage, or may be realized by a general-purpose processor and embedded software, or by a program by using a PC.

An operation of the interconnection point voltage detection device 25 will be described. The voltage detector 41 detects a voltage of the interconnection points LPR, LPS, and LPT of respective phases and outputs the detected voltage to the filtering unit 26. In the filtering unit 26, the memory 27 sequentially stores the detected voltage that is input, and retains the storage over a period of one cycle of a triangular wave (carrier wave) that is used in PWM control of triangular wave comparison system in the following control device 30 and is a wave that oscillates at constant cycles. The memory 27 sequentially erases the detected voltage of which storage is retained after passage of a period of one cycle. That is, in the memory 27, the detected voltage that is stored is updated with the passage of time, and the memory 27 stores a detected voltage that is detected over the past period of one cycle of the carrier wave from the current time.

The operation unit 28 reads out all detected voltages stored in the memory 27, calculates an average value of the read-out detected voltages, and outputs the calculated average voltage to the control device 30 as the interconnection point voltage V. Since the memory 27 stores the detected voltage detected over the past period of one cycle of the carrier wave from the current time, and the detected voltage is updated with the passage of time, the operation unit 28 can calculate a moving average of the detected voltages over a period of one cycle of the carrier waves by reading out all detected voltages stored in the memory 27 and calculating an average value of the detected voltages.

Note that, the configuration of the interconnection point voltage detection device 20 or 25 is not particularly limited as long as calculation of the moving average of the detected voltages, or operation of a part thereof can be performed.

The control device 30 controls an ON/OFF state of each switch of the converter 11 on the basis of the interconnection point voltage V detected as described above, or the like, and controls an output voltage of the converter 11. In the first embodiment, the interconnection point voltage V detected by performing moving-averaging is fed forward as a voltage command value, and the output voltage of the converter 11 is controlled. When the interconnection point voltage V detected by moving-averaging is fed forward as it is, that is, when performing PWM of a triangular wave comparison system by using the interconnection point voltage V, since the converter 11 ideally outputs the same voltage as the interconnection point voltage V, robustness against a voltage fluctuation can be secured to a certain extent. Particularly, the robustness against a voltage fluctuation when a current is zero is extremely high. However, since a signal delay occurs due to the moving average, it is preferable that each switching frequency of the converter 11 is high to decrease signal delay. Accordingly, as each switch of the converter 11, it is preferable to use a switching element of which a switching frequency is high.

Figure 3:
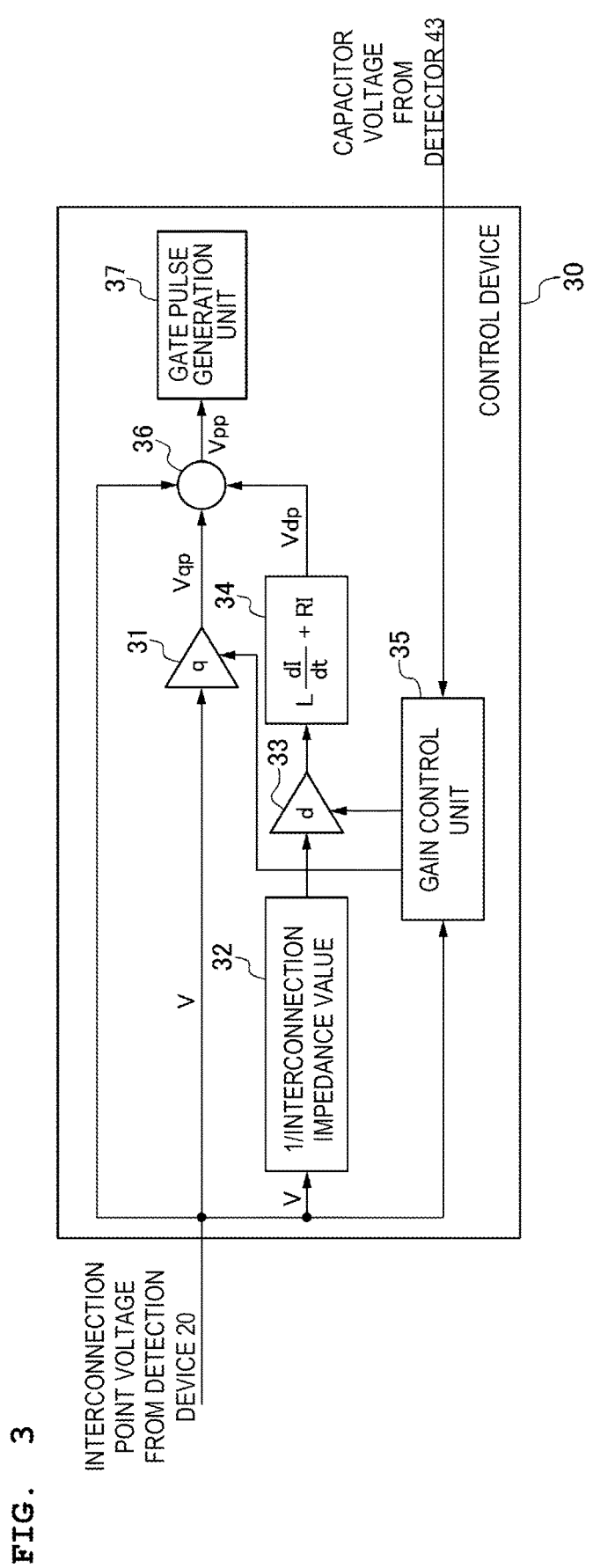
FIG. 3 is a schematic view illustrating a control device of the electric power conversion device according to the first embodiment of the invention.

(1-4) Configuration and Operation of Control Device of Electric Power Conversion Device According to First Embodiment Next, a configuration and an operation of the control device 30 will be described with reference to FIG. 3. First, the configuration of the control device 30 will be described. As illustrated in FIG. 3, the control device 30 includes a reactive power component voltage command value generation unit 31, a current calculation unit 32, an active power component current command value generation unit 33, an active power component voltage command value generation unit 34, a gain control unit 35, a voltage command value generation unit (voltage command value generation means) 36, and a gate pulse generation unit 37. The reactive power component voltage command value generation unit 31 is constituted by a multiplier in which a gain is q (actual number).

The current calculation unit 32 is constituted by a divider that performs division by an interconnection impedance value. The active power component current command value generation unit 33 is constituted by a multiplier in which a gain is d (actual number). The active power component voltage command value generation unit 34 is constituted to perform operation with the following Expression (1) with respect to an active power component current command value as a differential operation unit.

$$L \cdot (dI/dt) + RI \tag{1}$$

The active power component voltage command value generation unit 34 is constituted by an operation circuit capable of operating the expression, for example, in combination of a differentiator, an adder, and the like.

The voltage command value generation unit 36 is constituted by an adder. The gate pulse generation unit 37 is configured to generate a gate pulse signal for controlling ON/OFF of each switch of the converter 11 by known PWM control. The gain control unit 35 is configured to control a value of the gain d of the active power component current command value generation unit 33 and a value of the gain q of the reactive power component voltage command value generation unit 31.

Next, the operation of the control device 30 will be described. The control device 30 adds a voltage of which a phase is advanced by 90° with respect to an interconnection point voltage for outputting an active voltage, and a voltage having the same phase as an interconnection point voltage for outputting a reactive voltage, calculates a voltage command value Vpp by feeding forward the interconnection point voltage V, and controls the output voltage of the converter 11 on the basis of the voltage command value Vpp. Hereinafter, the operation will be described in detail.

In the control device 30, the interconnection point voltage V detected by the interconnection point voltage detection device 20 is input to the reactive power component voltage command value generation unit 31, the current calculation unit 32, the gain control unit 35, and the voltage command value generation unit 36. The reactive power component voltage command value generation unit 31 multiplies the detected value of the input interconnection point voltage V by q to generate a reactive power component voltage command value Vqp, and outputs the reactive power component voltage command value Vqp to the voltage command value generation unit 36. The current calculation unit 32 divides the detected value of the interconnection point voltage V by an interconnection impedance value, that is, a value ($\omega$L, $\omega$ is a frequency of the interconnection point voltage V, and L is an inductance value of the reactor 17) of the reactor 17R, converts the detected value of the interconnection point voltage V into a current value, and outputs the converted current value to the active power component current command value generation unit 33. Note that, ideally, a resistance component of the reactor 17R is zero, and thus in this embodiment, the resistance component of the reactor 17R is ignored. The active power component current command value generation unit 33 multiplies an input current value by d to generate an active power component current command value. The active power component current command value generation unit 33 outputs the active power component current command value to the active power component voltage command value generation unit 34.

The active power component voltage command value generation unit 34 performs operation of Expression (1) with respect to the active power component current command value, converts a current command value calculated from the interconnection point voltage into a voltage command value, calculates an active power component voltage command value Vdp, and outputs the active power component voltage command value Vdp to the voltage command value generation unit 36. Note that, ideally, the resistance component of the reactor 17 is zero, the resistance component of the reactor 17 is assumed as zero in this embodiment. Here, Expression (1) is an expression for calculating a voltage drop in a reactor from a current flowing through the reactor, the current is time-differentiated, and the product of the resistance component of the reactor and the current is added to a value obtained through multiplication by an inductance value of the reactor (L presents the inductance value of the reactor, R represents the resistance component of the reactor, and I represents the current flowing through the reactor). In addition, with regard to a relationship between a voltage and a current in the reactor, a phase of the current is delayed from a phase of the voltage by 90°.

Accordingly, a phase of the voltage value (the active power component voltage command value Vdp) calculated by Expression (1) is advanced by 90° with respect to the current value (the active power component current command value) used in the operation. As a result, the phase of the active power component voltage command value Vdp is also advanced by 90° with respect to the interconnection point voltage V having the same phase as in the active power component current command value. In this manner, the control device 30 has a function of calculating a voltage (the active power component voltage command value Vdp for outputting active power) of which a phase is advanced by 90° from the interconnection point voltage V by differentiating the interconnection point voltage V. Note that, for example, a differential value of the active power component current command value may be calculated by calculating a difference in time and a difference in the active power component current command value from a previous control cycle for every control cycle, and by dividing the difference in the active power component current command value by the difference in time.

The voltage command value generation unit 36 adds the detected value of the input interconnection point voltage V, the reactive power component voltage command value Vqp, and the active power component voltage command value Vdp, and generates the voltage command value Vpp. In this manner, the control device 30 has a function of calculating the voltage command value Vpp of the converter 11 on the basis of the system voltage calculated by moving-averaging. The voltage command value generation unit 36 outputs the generated voltage command value Vpp to the gate pulse generation unit 37. The gate pulse generation unit 37 generates a carrier wave (for example, a triangular wave) for PWM control, and modulates the input voltage command value Vpp by the carrier wave. Specifically, the gate pulse generation unit 37 standardizes the voltage command value Vpp, and generates a gate pulse signal by comparing the standardized voltage command value Vpp and the carrier wave with each other. The gate pulse generation unit 37 generates the gate pulse signal for controlling ON/OFF of the high side switch 12H and the low side switch 12L of the R-phase conversion part 11R of the converter 11 by modulation of the voltage command value Vpp by the carrier wave. The gate pulse generation unit 37 outputs the generated gate pulse signal to a corresponding switch. In this manner, the control device 30 controls ON/OFF of the high side switch 12H and the low side switch 12L of the R-phase conversion part 11R.

The gain control unit 35 controls the value of the gain d of the active power component current command value generation unit 33 and the value of the gain q of the reactive power component voltage command value generation unit 31. The gain control unit 35 determines the values of the gain q and the gain d on the basis of the interconnection point voltage V detected by the interconnection point voltage detection device 20, the frequency in the power system 50 (AC voltage source 55) which is calculated from the interconnection point voltage V, or the capacitor voltage of the capacitor 14 of the converter 11 which is detected by the capacitor voltage detector 43, and controls reactive power and active power output from the electric power conversion device 10.

For example, in a case where the capacitor voltage detected by the capacitor voltage detector 43 is higher than a predetermined range, the capacitor voltage can be reduced by increasing the active power flowing out from the electric power conversion device 10 to the power system 50 in comparison to the active power flowing into the electric power conversion device 10 from the active power source 15. In this manner, the gain control unit 35 balances the active power flowing into the electric power conversion device 10 from the active power source 15 and the active power flowing out from the electric power conversion device 10 to the power system 50 by increasing the value of the gain d and by increasing the active power output from the electric power conversion device 10. On the other hand, in a case where the capacitor voltage is lower than the predetermined range, the capacitor voltage can be raised by decreasing the active power flowing out from the electric power conversion device 10 to the power system 50 in comparison to the active power flowing into the electric power conversion device 10 from the active power source 15. In this manner, the gain control unit 35 balances the active power flowing into the electric power conversion device 10 from the active power source 15 and the active power flowing out from the electric power conversion device 10 to the power system 50 by decreasing the value of the gain d and by decreasing the active power output from the electric power conversion device 10.

In addition, for example, in a case where the interconnection point voltage V detected by the interconnection point voltage detection device 20 is lower than a reference range, the gain control unit 35 increases the value of the gain q to raise the interconnection point voltage V, that is, the system voltage. On the other hand, in a case where the interconnection point voltage V is higher than the reference range, the gain control unit 35 decreases the value of the gain q to lower the system voltage.

In addition, in a case where the frequency in the power system 50 which is calculated from the interconnection point voltage V is lower than a reference range, the power system 50 is in an excessive demand state. In this case, the gain control unit 35 increases the value of the gain d to increase a supply amount of the active power to the power system 50. On the other hand, in a case where the frequency in the power system 50 is higher than the reference range, the power system 50 is in a deficient demand state. The gain control unit 35 reduces the frequency by decreasing the value of the gain d to reduce the supply amount of the active power to the power system 50. Alternatively, the gain control unit 35 sets the value of the gain d to a negative actual number, and causes the active power to flow into the electric power conversion device 10 from the power system 50.

(1-5) Operation and Effect

In the above-described configuration, the electric power conversion device 10 according to the first embodiment is connected to the power system 50 through the interconnection impedance (the reactors 17R, 17S, and 17T), and includes the converter 11 that outputs a predetermined AC voltage, the system voltage detection device (the interconnection point voltage detection device 20) that detects the system voltage (the interconnection point voltage V) of the power system 50, and the control device 30 that controls the converter 11 by pulse width modulation control. The interconnection point voltage detection device 20 is configured to detect the interconnection point voltage V by calculating a moving average of a detected voltage (detected voltage detected by the voltage detector 41) over a period of one cycle of a carrier wave used in pulse width control, and the control device 30 is configured to calculate the voltage command value of the converter 11 on the basis of the interconnection point voltage V calculated by moving-averaging.

Accordingly, in the electric power conversion device 10 according to the first embodiment, since the interconnection point voltage detection device 20 detects the interconnection point voltage V by calculating a moving average of a detected voltage detected by the voltage detector 41 over a period of one cycle of a carrier wave used in pulse width control, ripples in the detected voltage and detection delay can be suppressed. According to this, even in a case where phase hit occurs in the power system 50, the output voltage of the electric power conversion device 10 can follow a fluctuation of a voltage of the power system 50, and an overcurrent is suppressed from flowing to the electric power conversion device 10.

In addition, since the electric power conversion device 10 according to the first embodiment is configured to calculate the active power component voltage command value by time-differentiating the detected interconnection point voltage V, the active power component voltage command value can be calculated quickly, and the overcurrent can also be suppressed from flowing to the electric power conversion device 10.

(2) Second Embodiment

In an electric power conversion device according to a second embodiment, the interconnection point voltage, which is detected by the interconnection point voltage detection device as a system voltage detection device, as the system voltage of the power system is handled as a current command value. More specifically, since phases of an active current and the interconnection point voltage are the same as each other, an active current command value is calculated as a real-number multiple of the interconnection point voltage, and the active voltage command value (active power component voltage command value) is calculated from the active current command value. In the second embodiment, the active current command value is determined by setting the interconnection point voltage as a current command value of 1 pu.

In this regard, more specifically, the active current command value is determined by setting the interconnection point voltage as the current command value of 1 pu for easy explanation in the second embodiment. As long as the active current command value is a value proportional to the interconnection point voltage, it is not necessarily to be 1 pu.

For example, in a case where the active current command value (pu value) is 0.2 pu, the product of the interconnection point voltage and 0.2 becomes the active current command value. On the other hand, with regard to a reactive current command value, a value obtained by shifting the phase of the interconnection point voltage by 90° is set as the current command value of 1 pu. As in the active current command value, the reactive current command value is determined by multiplying a value obtained by shifting a phase of the interconnection point voltage by 90° by a real number (by multiplying the value by the reactive current command value (pu value)). In this manner, a value of a real-number multiple of the interconnection point voltage V is set as the current command value. In the electric power conversion device according to the second embodiment, a configuration of a control device is different from the configuration of the control device 30 of the electric power conversion device 10 according to the first embodiment. The other configurations are the same as in the electric power conversion device 10 according to the first embodiment, and thus description thereof will be omitted.

Figure 4:
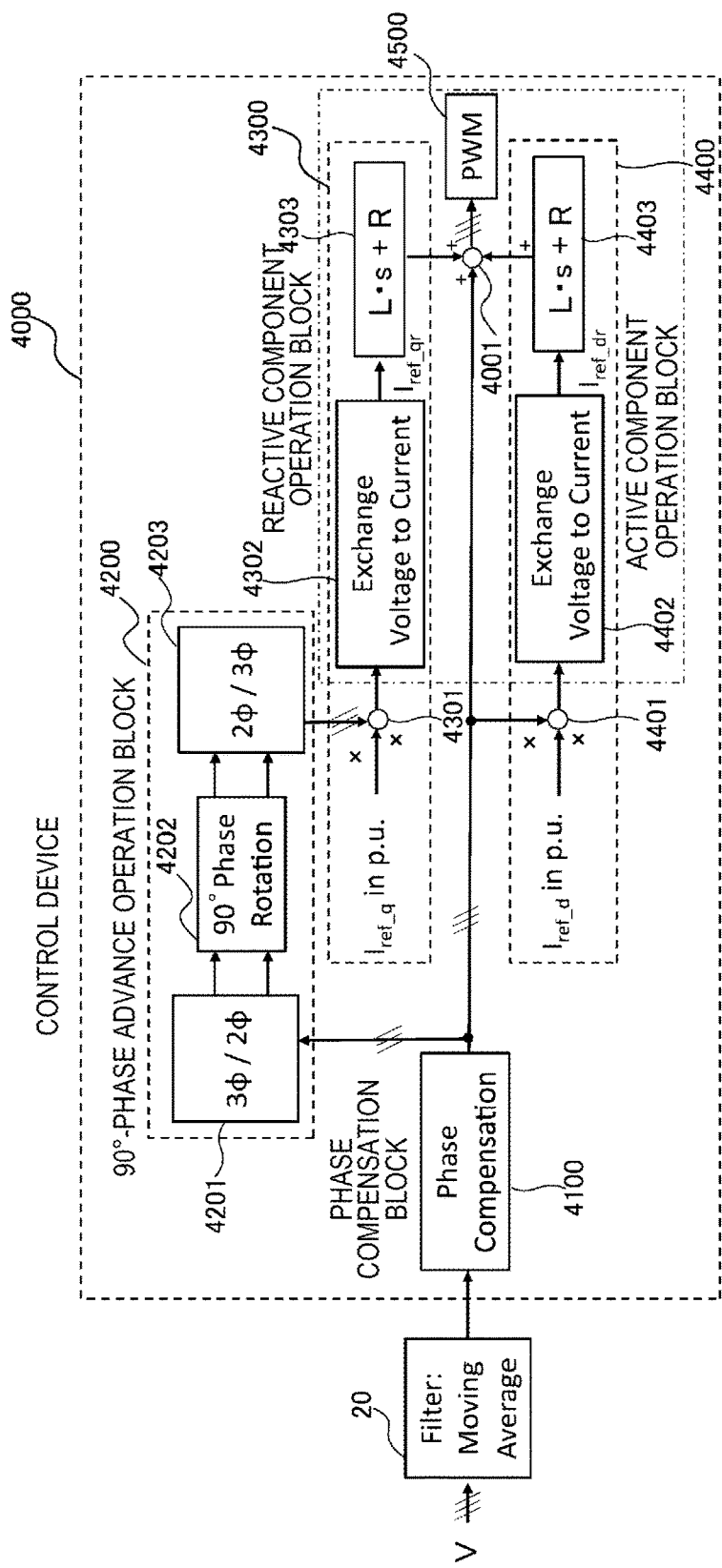
FIG. 4 is a schematic view illustrating a control device according to a second embodiment of the invention.

(2-1) Configuration and Operation of Control Device According to Second Embodiment of Invention FIG. 4 is a view illustrating a control device 4000 of the electric power conversion device according to the second embodiment. The control device 4000 includes a phase compensation block 4100, a 90°-phase advance operation block 4200, a reactive component operation block (reactive component operation unit) 4300, an active component operation block (active component operation unit) 4400, a voltage command value generation block 4001 (voltage command value generation unit), and a PWM block 4500. An operation of the control device 4000 will be described below.

The detected interconnection point voltage V is smoothed through the interconnection point voltage detection device 20, and is taken into the control device 4000. A signal of the interconnection point voltage V taken into the control device 4000 is input to the phase compensation block 4100. An output of the phase compensation block 4100 is input to the active component operation block 4400, the 90°-phase advance operation block 4200, and the voltage command value generation block 4001. In the active component operation block 4400, the interconnection point voltage V input from the phase compensation block 4100 and the active current command value (pu value) are integrated by a multiplier 4401, and then an integration result of the multiplier 4401 is converted into an active current command effective value Iref_dr by a current conversion unit 4402. In addition, in the active component operation block 4400, the active current command effective value Iref_dr is input to a voltage estimation unit 4403, a voltage value (active component voltage estimation value Vi_d) necessary to be applied to interconnection impedance (reactor) so as to cause the current to flow is estimated from the active current command effective value Iref_dr, and the estimation result is output to the voltage command value generation block 4001 as an active voltage command value. Specifically, the voltage estimation unit 4403 as a differential operation unit time-differentiates the active current command effective value Iref_dr calculated from the interconnection point voltage V, and adds the product of the differentiated active current command effective value Iref_dr and an inductance value of the interconnection impedance, and the product of the active current command effective value Iref_dr and a resistance value of the interconnection impedance to estimate the active component voltage estimation value Vi_d.

In the 90°-phase advance operation block 4200, a phase of the interconnection point voltage V input from the phase compensation block 4100 is rotated by 90° by using a rotation matrix. According to this, the phase is advanced by 90°, and the interconnection point voltage V is input to the reactive component operation block 4300. In the reactive component operation block 4300, an output of the 90°-phase advance operation block and a reactive power command value (pu value) are integrated by the multiplier 4301, and an output of the multiplier 4301 is converted into a reactive current command effective value Iref_qr by a current conversion unit 4302. In addition, in the reactive component operation block 4300, the reactive current command effective value Iref_qr is input to a voltage estimation unit 4303, and a voltage value (reactive component voltage estimation value Vi_q) necessary to be applied to the interconnection impedance (reactor) so as to cause the current to flow is estimated from the reactive current command effective value Iref_qr, and the estimation result is output to the voltage command value generation block 4001 as a reactive voltage command value (reactive power component voltage command value). Specifically, the voltage estimation unit 4303 as a differential operation unit performs estimation by differentiating the reactive current command effective value Iref_qr calculated from the interconnection point voltage V of which a phase is advanced by 90°, and by adding the product of the differentiated reactive current command effective value Iref_qr and the inductance value of the interconnection impedance, and the product of the reactive current command effective value Iref_qr and the resistance value of the interconnection impedance. In this manner, the voltage estimation units 4303 and 4403 differentiate the reactive current command effective value Iref_qr and the active current command effective value Iref_dr which are calculated from the interconnection point voltage, and this configuration corresponds to differentiation of the interconnection point voltage V. As described above, the control device has a function of calculating the reactive power component voltage command value and the active power component voltage command value by time-differentiating the interconnection point voltage V.

In the voltage command value generation block (voltage command value generation unit) 4001, the interconnection point voltage V which is input from the phase compensation block 4100 and of which a phase is compensated, the active voltage command value input from the active component operation block 4400, and the reactive voltage command value input from the reactive component operation block 4300 are added to generate a voltage command value of the electric power conversion device. As described above, the control device 4000 has a function of calculating the voltage command value of the converter on the basis of the system voltage calculated by moving-averaging. In the PWM block 4500, the voltage command value is input and is standardized in the PWM block 4500. In the PWM block 4500, the standardized voltage command value is modulated by PWM control of a triangular wave comparison system, a gate pulse of each switch of the converter is generated, and the gate pulse is output to each switch to drive the switch.

Next, an operation of respective blocks constituting the control device 4000 will be described. First, an operation of the phase compensation block 4100 will be described. The phase compensation block 4100 compensates a phase of the interconnection point voltage V which is delayed due to smoothing with the interconnection point voltage detection device 20. Specifically, the phase of the input interconnection point voltage V is advanced by a phase delayed with the interconnection point voltage detection device 20. More specifically, it is preferable to advance the phase by a phase corresponding to time of a period that is approximately the half of a moving average calculation period. As means for advancing the phase, as in the 90°-phase advance operation block 4200 to be described later, the phase may be advanced by the above-described phase by a rotation matrix after three-phase/two-phase conversion, and two-phase/three-phase conversion may be performed. Note that, it is preferable that the phase compensation block 4100 is provided, but the phase compensation block 4100 may not be provided.

Next, an operation of the 90°-phase advance operation block 4200 will be described. The 90°-phase advance operation block 4200 performs three-phase/two-phase conversion with respect to the interconnection point voltage V of each phase which is input from the phase compensation block 4100 with a three-phase/two-phase conversion unit 4201, and advances the phase of the interconnection point voltage V subjected to the three-phase/two-phase conversion by 90° with a rotation matrix by a phase rotation unit 4202. The 90°-phase advance operation block 4200 performs two-phase/three-phase conversion with respect to the interconnection point voltage V of which the phase is advanced by 90° with a two-phase/three-phase conversion unit 4203, and outputs the interconnection point voltage V of each phase of which the phase is advanced by 90° to the reactive component operation block 4300. Note that, the 90°-phase advance operation block 4200 may delay the phase by 90°. In this case, a symbol of the reactive current command value becomes opposite.

Next, the reactive component operation block 4300 and the active component operation block 4400 will be described. Since the two blocks have approximately the same operation, and description will be made together. The current conversion unit 4302 and the current conversion unit 4402 divide a voltage value (an output of the multiplier 4301 or the multiplier 4401) by a phase voltage rated voltage and converts the resultant value into a current rated value ampere value to calculate the active current command effective value Iref_dr and the reactive current command effective value Iref_qr.

The voltage estimation unit 4303 and the voltage estimation unit 4403 calculates the active component voltage estimation value Vi_d from the active current command effective value Iref_dr, and calculates the reactive component voltage estimation value Vi_q from the reactive current command effective value Iref_qr. The operation is performed by an instantaneous formula such as the following Expression (2) and Expression (3).

$$Vi\_d=(Ls+R)\cdot Iref\_dr \quad (2)$$

$$Vi\_q=(Ls+R)\cdot Iref\_qr \quad (3)$$

Here, L represents an inductance value of each phase, R represents a resistance value of a reactor of each phase, and s represents a Laplace operator. The active current command effective value Iref_dr (reactive current command effective value Iref_qr) is differentiated, the inductance value L is multiplied, and the product of the active current command effective value Iref_dr (reactive current command effective value Iref_qr) and the resistance value is added to the multiplication result to calculate the active component voltage estimation value Vi_d (reactive component voltage estimation value Vi_q). The reactive component operation block 4300 outputs the calculated reactive component voltage estimation value Vi_q to the voltage command value generation block 4001 as a reactive voltage command value, and the active component operation block 4400 outputs the calculated active component voltage estimation value Vi_d to the voltage command value generation block 4001 as an active voltage command value.

(2-2) Operation and Effect

The electric power conversion device according to the second embodiment has a similar configuration as in the electric power conversion device according to the first embodiment, and the control device 4000 is configured to calculate the voltage command value of the converter 11 on the basis of the interconnection point voltage V calculated by moving-averaging.

Accordingly, as in the first embodiment, since the electric power conversion device according to the second embodiment includes the interconnection point voltage detection device 20 that detects the interconnection point voltage V by calculating a moving average over a period of one cycle of a carrier wave used in pulse width control, it is possible to suppress ripples in a detected voltage and detection delay. According to this, even in a case where a phase hit occurs in the power system, the output voltage of the electric power conversion device can follow a fluctuation of a voltage of the power system, and an overcurrent is suppressed from flowing to the electric power conversion device.

In the electric power conversion device according to the second embodiment, since the control device 4000 is configured to calculate a necessary voltage from an instantaneous formula by setting a current command, the robustness against the phase hit is high.

(2-3) Modification Example of Second Embodiment

Modification Example 1 of Second Embodiment

When noise is included in the detected interconnection point voltage V, Vi_d and Vi_q which are calculated by the voltage estimation unit 4303 and the voltage estimation unit 4403 greatly varies. In this case, it is preferable that the voltage estimation unit 4303 and the voltage estimation unit 4403 calculate the active component voltage estimation value Vi_d and the reactive component voltage estimation value Vi_q by formulae in which Expression (2) and Expression (3) are modified such that differential operation is set as inexact differential as in the following Expression (4) and Expression (5). T in Expression (4) and Expression (5) is a time constant and can be arbitrarily set.

$$Vi\_d=(Ls/(Ts-1)+R)\cdot Iref\_dr \quad (4)$$

$$Vi\_q=(Ls/(Ts-1)+R)\cdot Iref\_qr \quad (5)$$

Modification Example 2 of Second Embodiment

In addition, in consideration of a case where an influence of the noise cannot be avoided even in the inexact differential, it is preferable to add a limiter to an output of the reactive component operation block 4300 and the active component operation block 4400. For example, a limiter block is provided in a rear stage of the reactive component operation block 4300 and the active component operation block 4400, and when outputs of the reactive component operation block 4300 and the active component operation block 4400 are out of a predetermined range, a limiter value that is set in advance to the limiter block is output. It is preferable that the limiter value is the same as a voltage (both a positive voltage and a negative voltage) applied to the interconnection impedance when a rated current flows through the interconnection impedance, or is set to have a certain extent of margin in the voltage, for example, approximately 1.5 times the voltage.

Modification Example 3 of Second Embodiment

Note that, when a harmonic voltage is superimposed on the power system, harmonics are also superimposed on the interconnection point voltage V. As in the second embodiment, in the case of handling the detected value of the interconnection point voltage V as the current command value, when a system voltage (the interconnection point voltage V) fluctuates due to superimposition of harmonics, the current command value also fluctuates. It is preferable to take a measure against the case. Note that, the fluctuation of the system voltage (the interconnection point voltage V) stated here represents that a difference occurs between a rated value of the system voltage and a value of the interconnection point voltage.

First, a countermeasure against the harmonics will be described. With respect to low-order harmonics, for example, it is preferable to cause the detected interconnection point voltage V to pass through a notch filter or a filter configured to attenuate a frequency of integral multiples of a predetermined frequency. In addition, with respect to high-order harmonics, for example, it is preferable to cause the detected interconnection point voltage V to pass through a low-pass filter. According to this, the harmonics superimposed on the interconnection point voltage V are attenuated, thereby attenuating the harmonics superimposed on the current command value. The harmonics may be attenuated by filtering the active current command effective value, the reactive current command effective value, and the like.

Note that, in the case of the inexact differential operation by Expression (4) and Expression (5), or when using the above-described low-pass filter as a measure against the harmonics, a phase delay occurs in the active voltage command value or the reactive voltage command value. To compensate the phase delay, when causing a reactive current to flow from the electric power conversion device, it is preferable to compensate the phase delay by slightly increasing the active current command value to add an active current to the reactive current. Similarly, when causing an active current to flow from the electric power conversion device, it is preferable to compensate the phase delay by slightly increasing the reactive current command value to add the reactive current to the active current. The active current represents a current in order for the electric power conversion device to output active power, and the reactive current represents a current in order for the electric power conversion device to output a reactive power. Both the active current and the reactive current are components of a current output from the electric power conversion device.

Modification Example 4 of Second Embodiment

Figure 5:
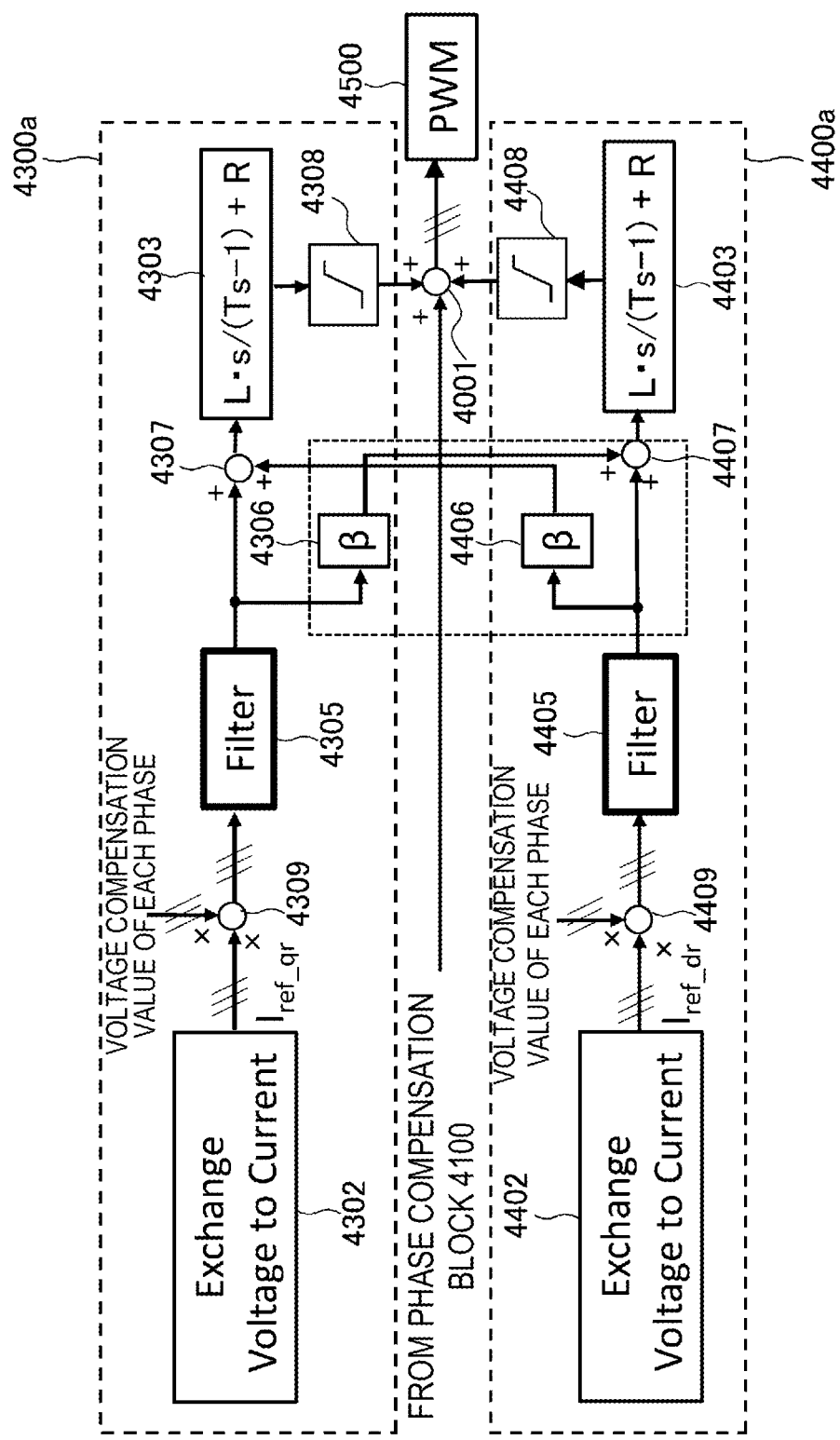
FIG. 5 is an enlarged schematic view of a part of a control device according to a modification example of the second embodiment of the invention.

Next, in Modification Example 4, a measure against various errors of the interconnection point voltage V will be described. First, when performing conversion from the active current command effective value Iref_dr and the reactive current command effective value Iref_qr into a voltage to be applied to the interconnection impedance, if using inexact differential instead of differential, a phase is delayed. A compensation method for the phase delay will be described. A control device of Modification Example 4 is different from the control device 4000 according to the second embodiment illustrated in FIG. 4 in the configuration of the reactive component operation block 4300 and the active component operation block 4400. FIG. 5 is an enlarged view of a part of the control device of Modification Example 4, and corresponds to a region surrounded by one-dot chain line in the control device 4000 illustrated in FIG. 4. A configuration of the control device other than the region illustrated in FIG. 5 is similar as in the second embodiment, and thus description thereof will be omitted.

As in a reactive component operation block 4300a and an active component operation block 4400a illustrated in FIG. 5, when performing phase delay compensation, both the blocks cannot be completely separated, and both the blocks interfere each other.

First, an operation of the reactive component operation block 4300a will be described. As in the second embodiment, the reactive current command effective value Iref_qr of each phase converted from the reactive current command value by the current conversion unit 4302 is multiplied by a voltage compensation value of each phase, which is calculated by a voltage compensation value operation block to be described later, for every same phase by a multiplier 4309, and thus a voltage fluctuation is compensated. The reactive current command effective value Iref_qr of which the voltage fluctuation is compensated is output to a filter block 4305, and thus harmonics are attenuated. For example, the filter block 4305 is constituted by a low-pass filter.

The reactive current command effective value Iref_qr in which the harmonics are attenuated is added in a multiplication unit 4307 to a current for phase delay compensation in the filter block 4305, which is calculated by multiplying the effective current command effective value Iref_dr by a real number β in a multiplier 4406, to input to the voltage estimation unit 4303. In addition, in the voltage estimation unit 4303, the reactive component voltage estimation value Vi_q, which is a voltage of the interconnection impedance necessary for flowing a current corresponding to the reactive current command effective value Iref_qr to which the current for phase delay compensation is added, is calculated by Expression (5) and is output as the reactive voltage command value. Note that, Expression (3) may be used instead of Expression (5).

Note that, for the reactive voltage command value and the active voltage command value, it is preferable to provide a limiter so that an excessive current does not flow. Accordingly, in Modification Example 4, a limiter block 4308 is provided between the voltage estimation unit 4303 of the reactive component operation block 4300a and the voltage command value generation block 4001, and a limiter block 4408 is provided between the voltage estimation unit 4403 of the active component operation block 4400a and the voltage command value generation block 4001. In the limiter blocks 4308 and 4408, it is preferable that a limiter value is set to a value having a necessary margin in a minimum value and a maximum value of a voltage to be applied to the interconnection impedance at the time of flowing a rated current.

In the limiter block 4308, in a case where the reactive voltage command value input from the voltage estimation unit 4303 is within a predetermined range, the reactive voltage command value is output to the voltage command value generation block 4001 as is, and in a case where the reactive voltage command value is out of the predetermined range, a limiter value set in advance is output to the voltage command value generation block 4001 as an output of the reactive component operation block 4300a, that is, as the reactive voltage command value. In addition, in the reactive component operation block 4300a, the reactive current command effective value Iref_qr of which harmonics are attenuated by the filter block 4305 is multiplied by a real number β by a multiplier 4306, and the resultant value is output to the active component operation block 4400a as a current for phase delay compensation in a filter block 4405.

Next, an operation of the active component operation block 4400a will be described. As in the second embodiment, the active current command effective value Iref_dr of each phase converted from the active current command value by the current conversion unit 4402 is multiplied by a voltage compensation value of each phase, which is calculated by a voltage compensation value operation block to be described later, for every same phase by a multiplier 4409, and thus a voltage fluctuation is compensated. The active current command effective value Iref_dr of which the voltage fluctuation is compensated is output to the filter block 4405, and thus harmonics are attenuated. For example, the filter block 4405 is constituted by a low-pass filter.

The active current command effective value Iref_dr in which the harmonics are attenuated is added in a multiplication unit 4407 to a current for phase delay compensation in the filter block 4305, which is calculated by multiplying the reactive current command effective value Iref_qr by a real number β by a multiplier 4306, to input to the voltage estimation unit 4303. In addition, in the voltage estimation unit 4403, the active component voltage estimation value Vi_d, which is a voltage of the interconnection impedance necessary for flowing a current corresponding to the active current command effective value Iref_dr to which the current for phase delay compensation is added, is calculated by Expression (4) and is output to the limiter block 4408 as the active voltage command value. Note that, Expression (2) may be used instead of Expression (4).

In the limiter block 4408, in a case where the active voltage command value is within a predetermined range, the active voltage command value is output to the voltage command value generation block 4001 as is, and in a case where the active voltage command value is out of the predetermined range, a limiter value set in advance is output to the voltage command value generation block 4001 as an output of the active component operation block 4400a, that is, as the active voltage command value. In addition, in the active component operation block 4400a, the active current command effective value Iref_dr of which harmonics are attenuated by the filter block 4405 is multiplied by a real number β by the multiplier 4306, and the resultant value is output to the reactive component operation block 4300a as a current for phase delay compensation in the filter block 4305.

In the voltage command value generation block (voltage command value generation unit) 4001, the phase-compensated interconnection point voltage V input from the phase compensation block 4100, the active voltage command value input from the active component operation block 4400, and the reactive voltage command value input from the reactive component operation block 4300 are added, and thus the voltage command value of the electric power conversion device is generated.

Figure 6:
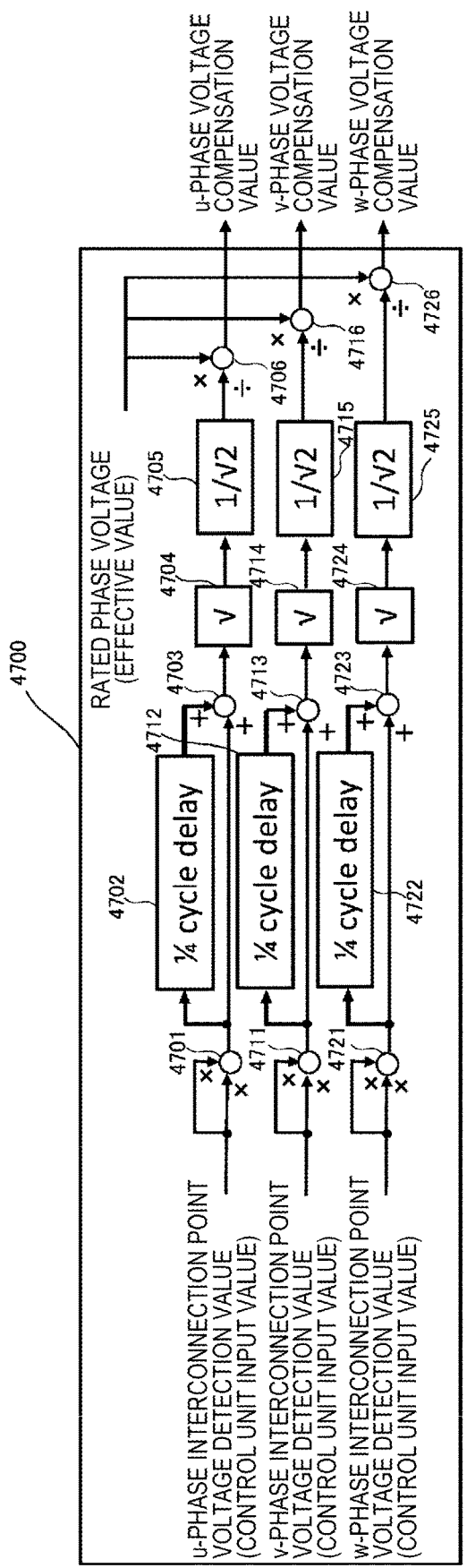
FIG. 6 is a schematic view illustrating a voltage compensation value operation block provided in the control device according to the modification example of the second embodiment of the invention.

Finally, description will be given of a voltage compensation value operation block that calculates a voltage compensation value for compensating a voltage fluctuation. The voltage compensation value operation block is provided in a control device and calculates the voltage compensation value from the input interconnection point voltage V of each phase for every phase. FIG. 6 illustrates a voltage compensation value operation block (voltage compensation value operation unit) 4700 that calculates a voltage compensation value for compensating the current command value (the reactive current command effective value and the active current command effective value) when the voltage fluctuation occurs during a static operation. In the voltage compensation value operation block 4700, a voltage compensation value of respective phases (a u-phase, a v-phase, and a w-phase) is calculated. A voltage compensation value calculating operation is the same in each phase, and thus description will be made by using the u-phase as a representative.

In the voltage compensation value operation block 4700, a detected value of an interconnection point voltage V of the u-phase which is smoothed in the interconnection point voltage detection device 20 is input, and a square value of the interconnection point voltage is calculated by a multiplier 4701. The square value of the interconnection point voltage is output to a ¼ cycle delay unit 4702 and an adder 4703. For example, the ¼ cycle delay unit 4702 is constituted by a memory or the like. The ¼ cycle delay unit 4702 stores the square value of the interconnection point voltage V in a memory over a period of ¼ cycle, and outputs the square value of the interconnection point voltage V to the adder 4703 as a past value of the square value of the interconnection point voltage V before ¼ cycle after passage of ¼ cycle. The adder 4703 adds a square value (current value) of the interconnection point voltage V which is input from the multiplier 4701, and the past value of the square value of the interconnection point voltage V which is input from the ¼ cycle delay unit 4702, and outputs the resultant value to a root operation unit 4704.

The root operation unit 4704 root-operates an output of the adder 4703, and outputs the resultant value to a divider 4705. The divider 4705 divides the output of the root operation unit 4704 by $\sqrt{2}$. The division result is a value corresponding to an effective value of the interconnection point voltage V of the u-phase. The divider 4705 outputs the division result to a u-phase voltage compensation value calculation unit 4706 as the effective value of the interconnection point voltage V. A value of a rated phase voltage of the u-phase is also input to the u-phase voltage compensation value calculation unit 4706. The u-phase voltage compensation value calculation unit 4706 calculates the u-phase voltage compensation value by dividing the rated voltage of the u-phase by the effective value of the interconnection point voltage V of the u-phase.

Note that, in a typical power system, since a voltage fluctuation during a static operation is small, the voltage fluctuation is allowable in a power conditioning subsystem (PCS: power conditioner) application in many cases. For example, a voltage fluctuation in a power distribution system during a static operation in Japan is approximately ±10%.

In addition, when performing voltage compensation for the voltage fluctuation during system accident, an unnecessary current flows in. Accordingly, in a case where a value of the interconnection point voltage exceeds a normal range, it is preferable not to perform the voltage fluctuation compensation. With regard to execution or non-execution of the voltage compensation, it is preferable to provide a limiter in each phase voltage compensation value on the basis of a voltage allowable value during a static operation, or a voltage value having a certain extent of margin in the voltage allowable value. For example, the limiter can be carried out by inserting a limiter block having the same configuration as in the limiter block 4308 (a limiter value is different) between the voltage compensation value operation block 4700 and the multiplier 4309, or between the voltage compensation value operation block 4700 and the multiplier 4409.

Note that, as in Modification Example 4, when voltage compensation operation (operation in the multiplier 4309 or 4409) is inserted to a front stage of differential operation (operation in the voltage estimation unit 4303 or 4403), there is a possibility that a large voltage command value may be output in differential operation immediately after switching of execution and non-execution of the voltage fluctuation compensation. Accordingly, the voltage compensation operation is preferably inserted to a rear stage of the differential operation. Note that, in the case of insertion to the front stage, it is necessary to insert a multiplication unit such as a multiplier capable of performing a real number multiple between the voltage compensation value operation block 4700 and the multiplier 4309 or 4409, and to take a measure of reducing a gain of the multiplication unit step by step so that the voltage compensation is not suddenly stopped.

(3) Third Embodiment

An electric power conversion device according to a third embodiment is configured to control an output of the power converter by feeding back a current output from the electric power conversion device in comparison to the electric power conversion device according to the second embodiment. Hereinafter, the current feedback control will be described.

In the feedback control of the current output from the power converter, there are two cases including the case of controlling active power output from the electric power conversion device by feeding back an active current, and the case of controlling reactive power output from the electric power conversion device by feeding back a reactive current. If the power system is close to three-phase equilibrium, in the case of controlling the active power, instantaneous active power can be fed back, and in the case of controlling the reactive power, instantaneous reactive power can be fed back. The reason for this is as follows. In the three-phase equilibrium, the instantaneous active power is a three-phase sum of the product of the active current and the interconnection point voltage V, and the instantaneous reactive power is a three-phase sum of the product of the reactive current and the interconnection point voltage V. Accordingly, the active current and the instantaneous active power are proportional to each other, and the reactive current and the instantaneous reactive power are proportional to each other.

Specifically, for example, in the control device 4000, an instantaneous power operation block that calculates the instantaneous active power and the instantaneous reactive power which are output from the electric power conversion device, a multiplier that can adjust a gain, and a subtracter that calculates a difference from the current command value are provided. In addition, the instantaneous active power and the instantaneous reactive power which are output from the instantaneous power operation block are multiplied by a predetermined gain by the multiplier to adjust the magnitude, a difference between the active current command value and the instantaneous active power and a difference between the reactive current command value and the instantaneous reactive power are calculated by the subtracter, the instantaneous active power is fed back to the active current command value, and the instantaneous reactive power is fed back to the reactive current command value. The operation corresponds to current feedback control.

The electric power conversion device according to the third embodiment has the same configuration as in the second embodiment. Accordingly, the same effect can be obtained, and the output of the power converter is controlled by feeding back the current (the active power or the reactive power) as described above, and thus the current (that is, the active power or the reactive power) output from the power converter can be more accurately controlled.

Figure 7:
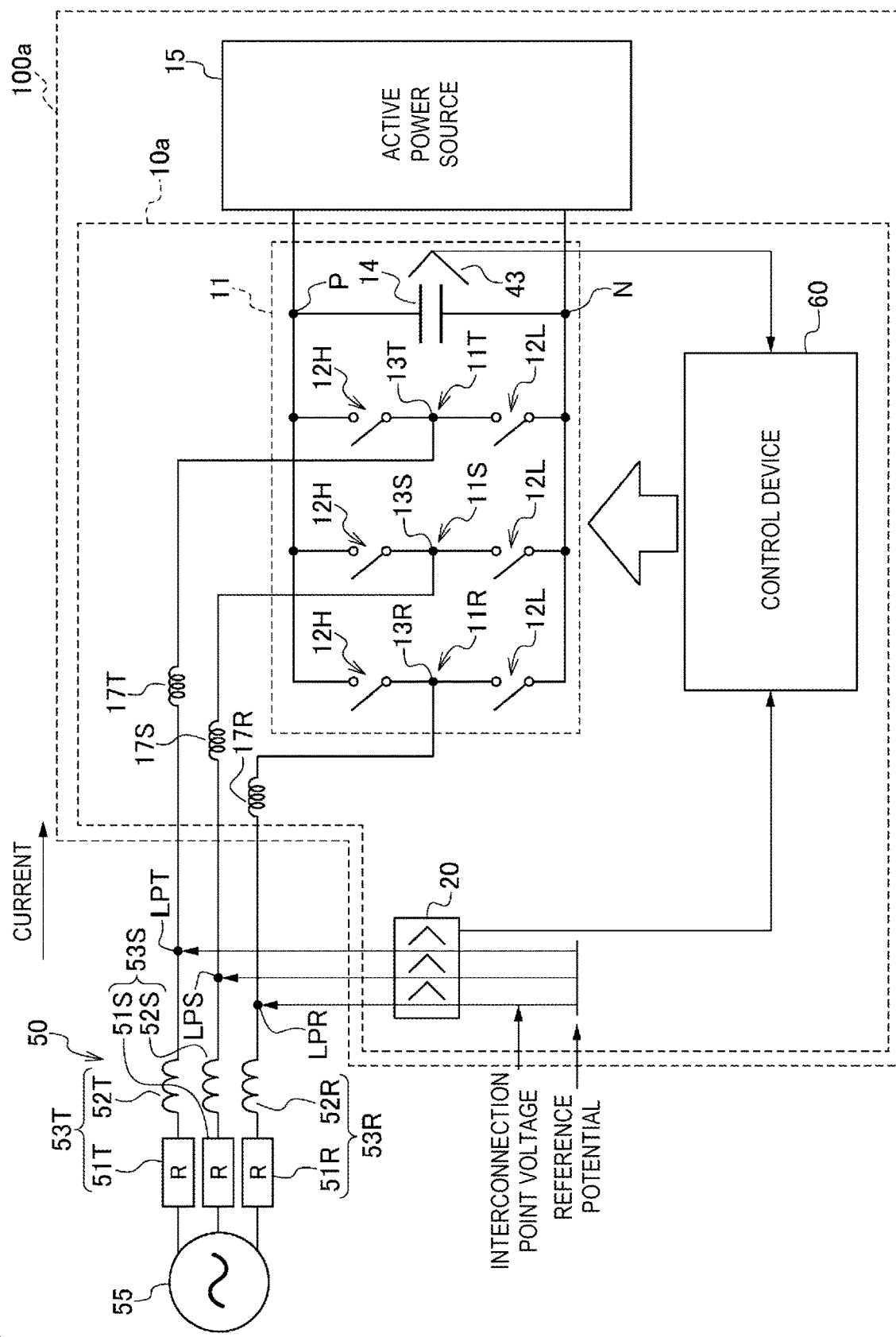
FIG. 7 is a schematic view illustrating an example of an electronic power generation system including an electric power conversion device according to a fourth embodiment of the invention.

(4) Fourth Embodiment (4-1) Overall Configuration of Electric Power Conversion Device According to Fourth Embodiment The electric power conversion device according to the fourth embodiment will be described with reference to FIG. 7 in which the same reference numeral is given to the same configuration as in FIG. 1. As illustrated in FIG. 7, an electric power conversion device 10a according to the fourth embodiment is used in an power generation system 100a as in the first embodiment. The electric power conversion device 10a is different from the electric power conversion device 10 according to the first embodiment in that a control device 60 configured to perform vector control is provided. More specifically, the control device 60 is a vector control unit that calculates the voltage command value of the converter 11 by vector control on the basis of the system voltage differently from the control device 30 (refer to FIG. 3) according to the first embodiment. The configuration other than the control device 60 is the same as in the electric power conversion device 10 according to the first embodiment, and thus description thereof will be omitted.

(4-2) Configuration and Operation of Control Device of Electric Power Conversion Device According to Fourth Embodiment The control device 60 generates the voltage command value of the converter 11 on the basis of the interconnection point voltage as the system voltage of the power system 50 by using a known vector control method. In this specification, the control device 60 will be described as a control device to which a vector control method disclosed in Japanese Patent No. 4,373,040 is applied as an example.

Figure 8:
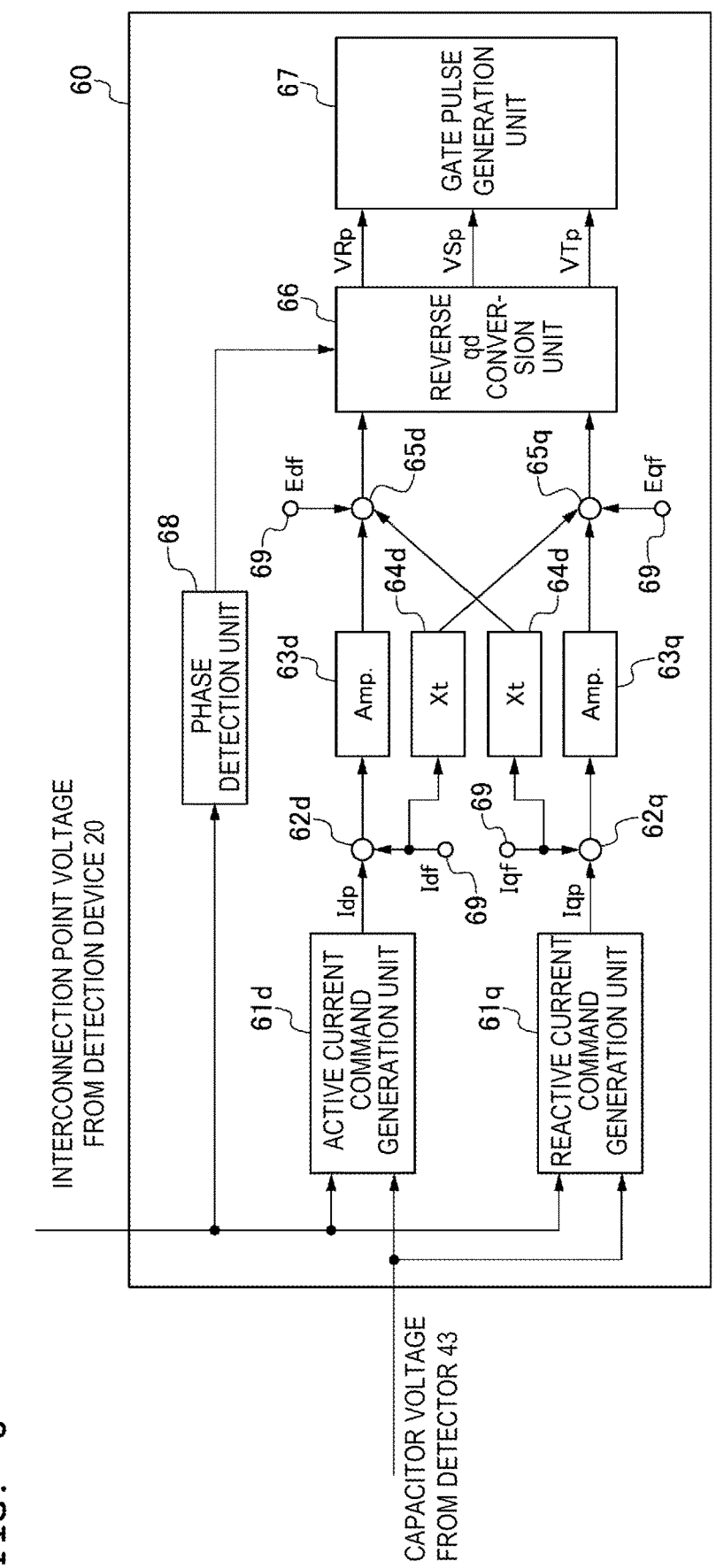
FIG. 8 is a schematic view illustrating a control device of the electric power conversion device according to the fourth embodiment of the invention.

First, the configuration of the control device 60 will be described. Since high-speed control is required, typically, a control device of a self-excited converter converts a three-phase alternating current into two-phase DC components including an active component and a reactive component by dq conversion, and is constituted by a non-interference vector control system. As illustrated in FIG. 8, the control device 60 includes an active current command generation unit 61d, a reactive current command generation unit 61q, a phase detection unit 68, a qd conversion unit 69 (in FIG. 8, only an output terminal represented by a circle in the drawing is illustrated), an inverse qd conversion unit 66, a gate pulse generation unit 67, operation amplification circuits 63d and 63q, adders 62d, 62q, 65d, and 65q, and a multiplier 64d.

The active current command generation unit 61d generates an active current command value Idp on the basis of the interconnection point voltage V, a frequency of the power system 50 which is calculated from the interconnection point voltage V, a capacitor voltage of the capacitor 14 of the converter 11, and the like. The reactive current command generation unit 61q generates a reactive current command value Iqp on the basis of the interconnection point voltage V, the frequency of the power system 50, the capacitor voltage of the capacitor 14 of the converter 11, and the like. The phase detection unit 68 detects a phase of the interconnection point voltage V from the interconnection point voltage V by using a known operation method such as phase locked loop (PLL) and discrete Fourier transform (DFT). The qd conversion unit 69 converts a three-phase alternating current into two-phase DC components including an active component and a reactive component by dq conversion with the phase detected by the phase detection unit 68 set as a reference phase. The reverse qd conversion unit 66 performs an inverse dg conversion of an active component voltage command value and a reactive component voltage command value and further performs two-phase/three-phase conversion to generate three-phase output voltage command values (VRp, VSp, and VTp). The gate pulse generation unit 67 generates a gate pulse signal for controlling ON/OFF of each switch of the converter 11 by known PWM control on the basis of the voltage command values.

Next, an operation of the control device 60 will be described. The control device 60 controls the converter 11 by setting active power and reactive power as a command value. In the control device 60, the interconnection point voltage V detected by the interconnection point voltage detection device 20 is input to the active current command generation unit 61d, the reactive current command generation unit 61q, and the phase detection unit 68. The phase detection unit 68 detects a phase of the interconnection point voltage V from the interconnection point voltage V by the PLL, and outputs a detected phase to the qd conversion unit 69 and the inverse qd conversion unit 66 as a reference phase.

The qd conversion unit 69 performs two-phase conversion of the interconnection point voltage V of each phase and a current of each phase which is detected by a current detector (not illustrated), and calculates an active voltage detection value Edf, an active current detection value Idf, a reactive voltage detection value Eqf, and a reactive current detection value Iqf.

In the control device 60, non-interference control of computation of the active power component voltage command value and computation of the reactive power component voltage command value is performed, and an operation of these computations will be sequentially described. First, a computation operation of the active power component voltage command value will be described. The interconnection point voltage V and a capacitor voltage of the capacitor 14 from the capacitor voltage detector 43 are input to the active current command generation unit 61d, and the active current command generation unit 61d calculates a frequency of the power system 50 from the interconnection point voltage V, generates the active current command value Idp for outputting predetermined active power on the basis of the interconnection point voltage V, the capacitor voltage, and the frequency, and outputs the active current command value Idp to the adder 62d.

The adder 62d calculates a deviation between the active current command value Idp and the active current detection value Idf obtained by two-phase conversion in the qd conversion unit 69, and outputs the calculated deviation to the operation amplification circuit 63d. The operation amplification circuit 63d performs operation amplification of the deviation. An active current is feedback controlled by operation in the adder 62d and the operation amplification circuit 63d. The operation amplification circuit 63d outputs the amplified difference to the adder 65d. At this time, the active current detection value Idf is input to the multiplier 64d in which a gain is impedance Xt of interconnection impedance (in this embodiment, a reactor), is multiplied by the gain Xt, and the resultant value is output to the adder 65q.

The adder 65d adds the input difference amplified by the operation amplification circuit 63d, the active voltage detection value Edf obtained by two-phase conversion in the qd conversion unit 69, and the reactive current detection value Iqf multiplied by Xt to generate the active power component voltage command value. The control device 60 performs non-interference control with computation of the reactive power component voltage command value by adding signals obtained by multiplying the reactive current detection value Iqf by the impedance Xt. The adder 65d outputs the generated active power component voltage command value to the inverse qd conversion unit 66.

Next, the computation operation of the reactive power component voltage command value will be described. The interconnection point voltage V and the capacitor voltage of the capacitor 14 are input to the reactive current command generation unit 61q, the reactive current command generation unit 61q further calculates the frequency of the power system 50 from the interconnection point voltage V, generates the reactive current command value Iqp for outputting predetermined reactive power on the basis of the interconnection point voltage V, the capacitor voltage, and the frequency, and outputs the reactive current command value Iqp to the adder 62q.

The adder 62q calculates a deviation between the reactive current command value Iqp and the reactive current detection value Iqf obtained by two-phase conversion in the qd conversion unit 69, and outputs the calculated deviation to the operation amplification circuit 63q. The operation amplification circuit 63q performs operation amplification of the deviation. The reactive current is feedback controlled by operation in the adder 62q and the operation amplification circuit 63q. The operation amplification circuit 63q outputs the amplified difference to the adder 65q. At this time, the reactive current detection value Iqf is input to the multiplier 64d in which a gain is impedance Xt of interconnection impedance (in this embodiment, a reactor), and is multiplied by the gain Xt, and the resultant value is output to the adder 65d.

The adder 65q adds the input difference amplified by the operation amplification circuit 63q, the reactive voltage detection value Eqf obtained by two-phase conversion in the qd conversion unit 69, and the active current detection value Idf multiplied by Xt to generate the reactive power component voltage command value. The control device 60 performs non-interference control with computation of the active power component voltage command value by adding signals obtained by multiplying the active current detection value Idf by the impedance Xt. The adder 65d outputs the generated reactive power component voltage command value to the inverse qd conversion unit 66.

The inverse qd conversion unit 66 performs inverse dq conversion of the input active power component voltage command value and reactive power component voltage command value, further performs two-phase/three-phase conversion to generate voltage command values VRp, VSp, and VTp of respective phases of the converter 11, and outputs the voltage command values to the gate pulse generation unit 67. The gate pulse generation unit 67 generates a carrier wave (for example, a triangular wave) for PWM control, and modulates the input voltage command values VRp, VSp, and VTp of respective phases with the carrier wave. The gate pulse generation unit 67 generates a gate pulse signal for controlling ON/OFF of the high side switch 12H and the low side switch 12L of each of the R-phase conversion part 11R, the S-phase conversion part 11S, and the T-phase conversion part 11T of the converter 11 by modulation with the carrier wave of the voltage command value. The gate pulse generation unit 67 outputs the generated gate pulse signal to each switch. The control device 60 controls ON/OFF of the high side switch 12H and the low side switch 12L of each of the R-phase conversion part 11R, the S-phase conversion part 11S, and the T-phase conversion part 11T of the converter 11.

(4-3) Operation and Effect

The electric power conversion device 10a according to the fourth embodiment has the same configuration as in the electric power conversion device 10 according to the first embodiment, and thus the same effect as in the electric power conversion device according to the first embodiment can be obtained. In addition, the electric power conversion device 10a according to the fourth embodiment is configured as a vector control unit that calculate the voltage command value by vector control on the basis of the system voltage (the interconnection point voltage V). Accordingly, in the electric power conversion device 10a, even in the case of using the vector control, since the interconnection point voltage detection device including a filtering unit by moving-averaging is provided, ripples are reduced, detection delay is small, the interconnection point voltage is detected, and feedforward is possible, and the same effect as in the electric power conversion device according to the first embodiment can be obtained. Even when replacing only the interconnection point detection unit while using the vector control device that has been spread, there is a merit. That is, modification of a ready-made product is easy.

Figure 9:
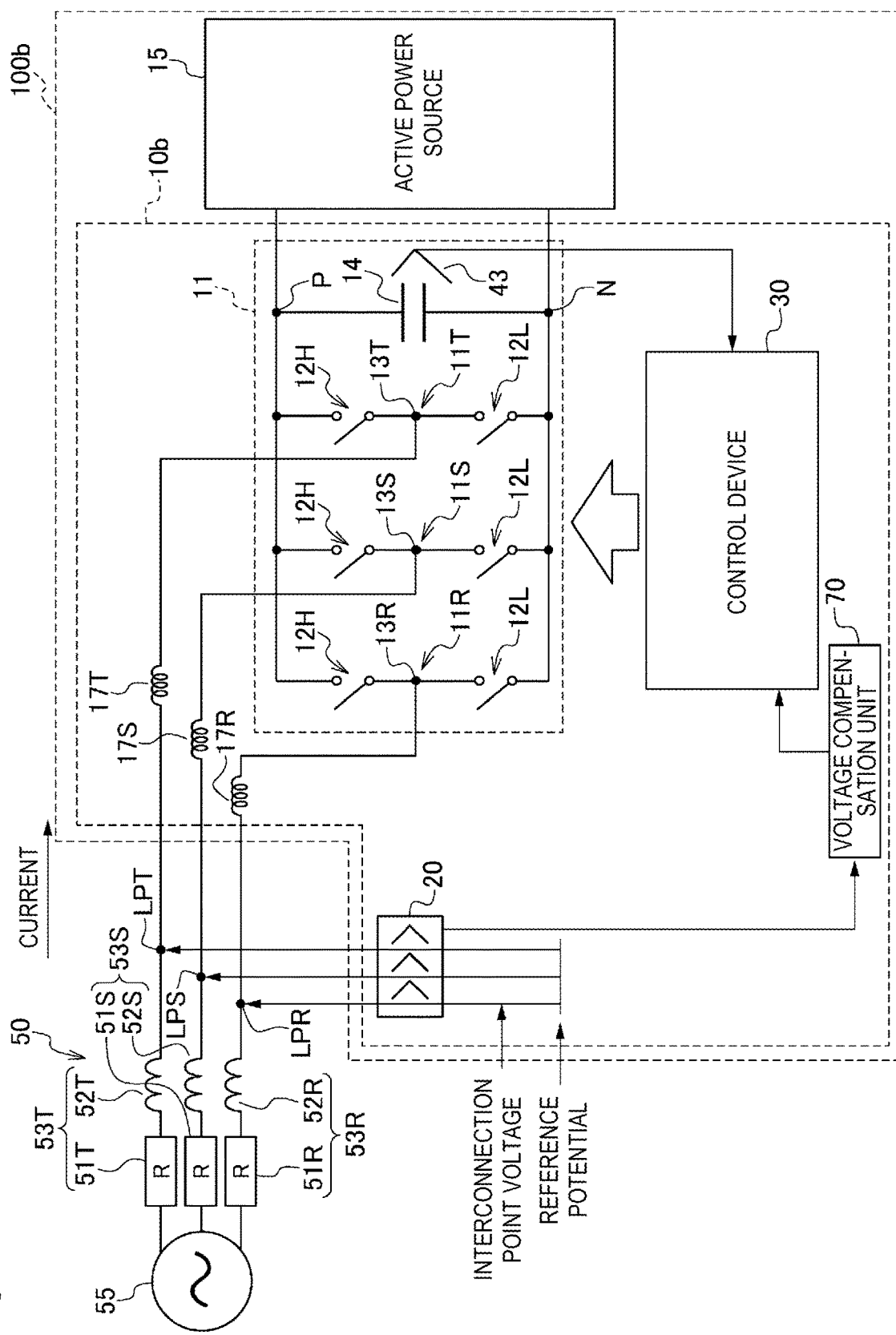
FIG. 9 is a schematic view illustrating an example of an power electronic power generation system including an electric power conversion device according to a fifth embodiment of the invention.

(5) Fifth Embodiment (5-1) Overall Configuration of Electric Power Conversion Device According to Fifth Embodiment An electric power conversion device according to a fifth embodiment will be described with reference to FIG. 9 in which the same reference numeral is given to the same configuration as in FIG. 1. As illustrated in FIG. 9, an electric power conversion device 10b according to the fifth embodiment is used in an power generation system 100b as in the first embodiment. The electric power conversion device 10b is different from the electric power conversion device 10 according to the first embodiment in that a voltage compensation unit 70 that compensates the detected interconnection point voltage V is provided. The voltage compensation unit 70 compensates a difference between a rated voltage of the power system 50 and the interconnection point voltage Vas a system voltage which is detected by the interconnection point voltage detection device 20 as a system voltage detection device. More specifically, a peak value Vpeak of the detected interconnection point voltage V is calculated, and a difference between the rated voltage and the peak value Vpeak is added. The other configurations are the same as in the electric power conversion device 10 according to the first embodiment, and thus description thereof will be omitted.

Figure 10:
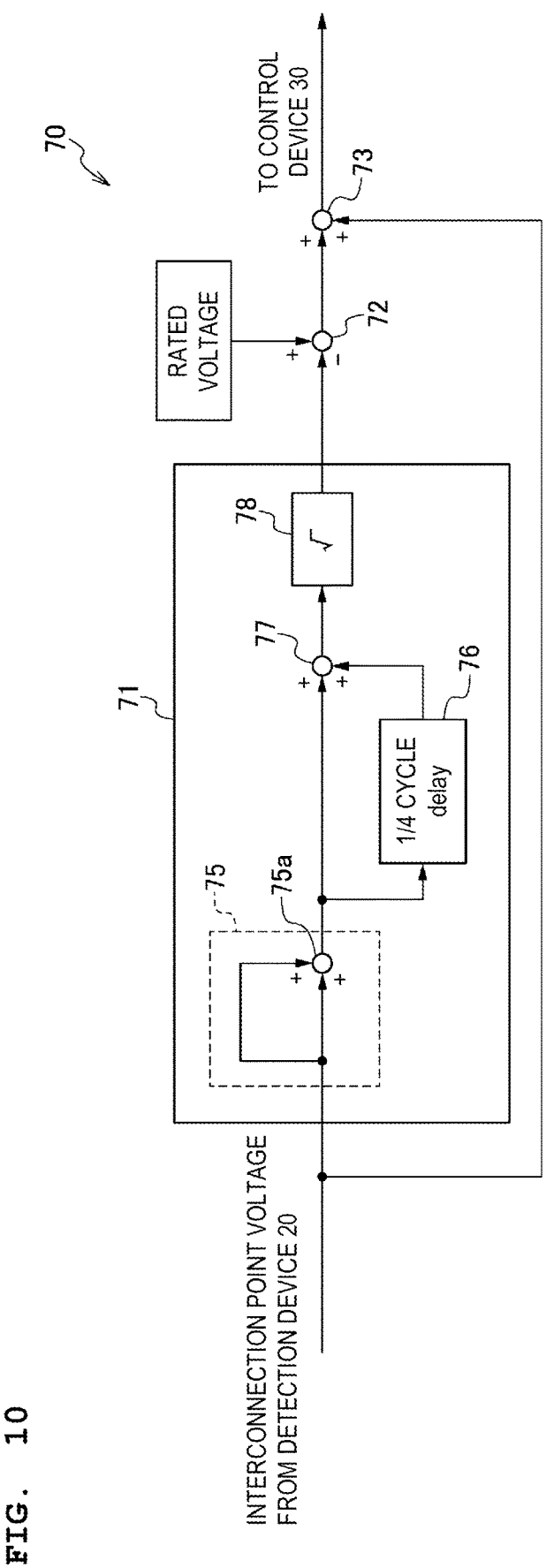
FIG. 10 is a schematic view illustrating a voltage compensation unit of the electric power conversion device according to the fifth embodiment of the invention.

(5-2) Configuration and Operation of Voltage Compensation Unit According to Fifth Embodiment First, the configuration of the voltage compensation unit 70 will be described. As illustrated in FIG. 10, the voltage compensation unit 70 includes a peak value operation unit 71, a subtracter 72, and an adder 73. The peak value operation unit 71 utilizes a configuration in which the peak value Vpeak of the interconnection point voltage can be calculated by the following Expression (6). Accordingly, the peak value operation unit 71 includes a square operation unit 75, a temporary data retention unit 76, an adder 77, and a root operation unit 78.

$$V\text{peak} = ((Vp^2 + (Vp^2)b))^{0.5} \quad (6)$$

Here, Vp represents a detected value of the interconnection point voltage V, $(Vp^2)$ b represents a past value of a square value $Vp^2$ of a detected value of the interconnection point voltage V before a period of ¼ cycle.

The square operation unit 75 has a configuration in which a signal line from the interconnection point voltage detection device 20 (refer to FIG. 10) is branched into two parts, and the two signal lines are connected to a multiplier 75a, and the square value of the interconnection point voltage V is calculated by the multiplier 75a. Note that, the configuration of the square operation unit 75 is not particularly limited as long as the square value of the interconnection point voltage V can be calculated. For example, the temporary data retention unit 76 includes a known memory such as a DRAM, an SRAM, a flash memory, and a hard disk drive, the square value $Vp^2$ of the detected value is stored in the memory, and the square value stored in the memory is output after retention for a period of ¼ cycle of the interconnection point voltage V.

Next, an operation of the voltage compensation unit 70 will be described. In the voltage compensation unit 70, the detected value Vp of the interconnection point voltage V is input to the peak value operation unit 71 and the adder 73. In the peak value operation unit 71, when the detected value Vp is input, the square operation unit 75 calculates the square value $Vp^2$ of the detected value Vp and outputs the square value to the temporary data retention unit 76 and the adder 77. When receiving the square value $Vp^2$ of the detected value Vp, the temporary data retention unit 76 stores the square value $Vp^2$ of the detected value in the memory, and outputs the square value $Vp^2$ stored in the memory as the past value $(Vp^2)$b after retention for a period of ¼ cycle of the interconnection point voltage V. That is, the temporary data retention unit 76 outputs the square value $Vp^2$ calculated before ¼ cycle as the past value $(Vp^2)$b in comparison to the square value $Vp^2$ of the detected value Vp. The temporary data retention unit 76 sequentially stores the square value $Vp^2$ of the detected value in the memory, and sequentially outputs the past value $(Vp^2)$b to the adder 77 after retention for a period of ¼ cycle of the interconnection point voltage V.

The adder 77 adds the square value $Vp^2$ of the detected value and the past value $(Vp^2)$b of the square value $Vp^2$ before ¼ cycle, and outputs the addition result $(Vp^2+(Vp^2)$ b) to the root operation unit 78. When receiving the addition result $(Vp^2+(Vp^2)$b), the root operation unit 78 calculates a square root of the multiplication result, and calculates the peak value Vpeak $(=(Vp^2+(Vp^2)b)^{0.5})$ of the interconnection point voltage V. The root operation unit 78 outputs the calculated peak value Vpeak to the subtracter 72. In this manner, the peak value operation unit 71 performs operation in Expression (6) to calculate the peak value Vpeak of the interconnection point voltage V. Note that, the peak value Vpeak of the interconnection point voltage V is a DC amount.

The rated voltage of the power system 50 and the peak value Vpeak are input to the subtracter 72, and the subtracter 72 calculates a difference between the rated voltage and the peak value Vpeak as a compensation voltage. The subtracter 72 outputs the compensation voltage to the adder 73. The compensation voltage and the interconnection point voltage V are input to adder 73, and the adder 73 adds the compensation voltage to the interconnection point voltage V, and outputs the compensated interconnection point voltage V to the control device 30. In this manner, the voltage compensation unit 70 calculates the difference between the rated voltage and the peak value Vpeak of the interconnection point voltage Vas the compensation voltage, and adds the calculated compensation voltage to the interconnection point voltage V to compensate a deviation between the interconnection point voltage V and the rated voltage.

(5-3) Operation and Effect

Since the electric power conversion device 10b according to the fifth embodiment has the same configuration as in the electric power conversion device 10 according to the first embodiment, the same effect as in the electric power conversion device according to the first embodiment can be obtained. In addition, the electric power conversion device 10b according to the fifth embodiment includes the voltage compensation unit 70 that compensates the difference between the system voltage (the interconnection point voltage V) and the rated voltage of the power system 50, and the voltage compensation unit 70 is configured to compensate the interconnection point voltage V by calculating the peak value Vpeak of the interconnection point voltage V and adding the difference between the rated voltage and the peak value Vpeak to the interconnection point voltage V. Accordingly, the electric power conversion device 10b according to the fifth embodiment can reduce a differential voltage between the interconnection point voltage V and a voltage component output by feedforward of the interconnection point voltage V, and can follow a fluctuation of the interconnection point voltage V. In addition, when the active power component voltage command value and the reactive power component voltage command value are zero, a current can be suppressed from being output from the electric power conversion device 10b.

(6) Modification Example

Modification Example 1

In the electric power conversion device 10 according to the first embodiment, description has been given of a case where the detected interconnection point voltage V is time-differentiated to calculate the active voltage component voltage command value of which a phase is advanced by ¼ cycle from the interconnection point voltage V, but the invention is not limited to this case. In this case, for example, the detected interconnection point voltage V is retained in the memory or the like over a period of ¼ cycle, a voltage delayed by ¼ cycle from the interconnection point voltage V is generated, and the voltage delayed by ¼ cycle is multiplied by −1 to generate a voltage that is advanced by ¼ cycle from the interconnection point voltage V. In addition, the active voltage component voltage command value of which a phase is advanced by ¼ cycle from the interconnection point voltage V is calculated on the basis of the voltage that is advanced by ¼ cycle from the interconnection point voltage V.

(7) Verification Experiment

Verification Experiment 1

As Verification Experiment 1, the electric power conversion device 10 illustrated in FIG. 1 was simulated, an output of the interconnection point voltage detection device was calculated, and a ripple state of the detected interconnection point voltage V was confirmed. In addition, the gain q of the reactive power component voltage command value generation unit 31 and the gain d of the active power component current command value generation unit 33 were set to zero in order for the electric power conversion device 10 to output an approximately same voltage as the interconnection point voltage V. That is, in the case of only feedforward of the interconnection point voltage V, a current output from the electric power conversion device 10 was calculated, and a state of detection delay of the interconnection point voltage V was confirmed.

Here, description will be given of the reason why the state of detection delay of the interconnection point voltage V can be investigated by setting the electric power conversion device 10 to only feedforward of the interconnection point voltage V, and by calculating the output current of the electric power conversion device 10. In a case where detection delay does not occur in the interconnection point voltage V, an approximately the same voltage as the interconnection point voltage V is output from the electric power conversion device 10, a differential voltage between the output voltage of the electric power conversion device 10 and the system voltage of the power system 50 becomes approximately zero, and an output current of the electric power conversion device 10 also becomes approximately zero. On the other hand, in a case where detection delay occurs in the interconnection point voltage V, a differential voltage occurs between the output voltage of the electric power conversion device 10 and the system voltage of the power system 50 by a value corresponding to the detection delay of the interconnection point voltage V, and a current is output from the electric power conversion device 10. Accordingly, it is possible to investigate the state of the detection delay of the interconnection point voltage V by causing the electric power conversion device 10 to output an approximately the same voltage as the interconnection point voltage V and by calculating the output current of the electric power conversion device 10.

Figure 11A:
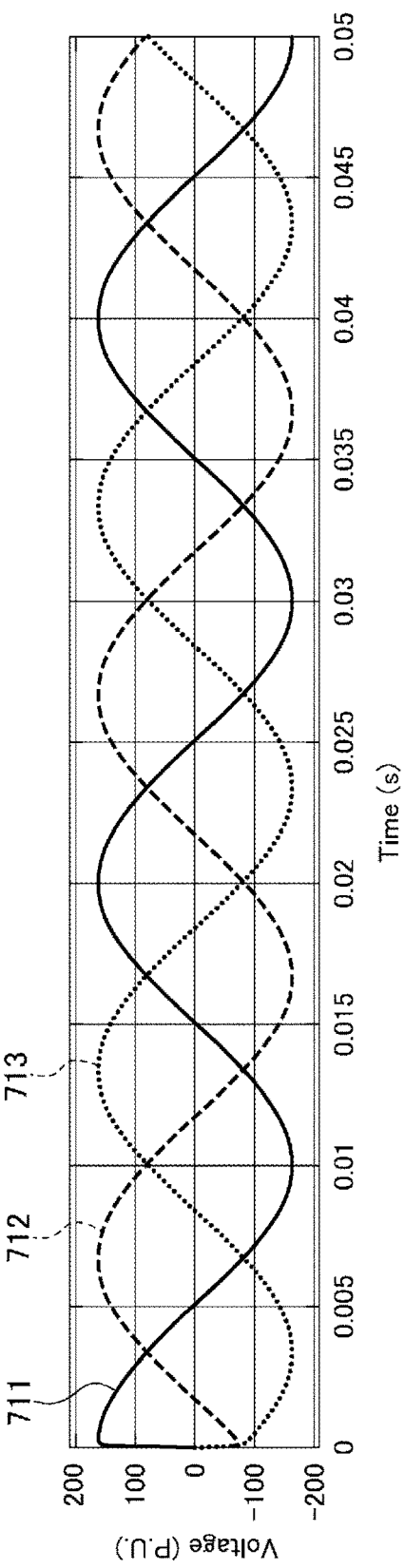
FIG. 11A is a graph showing an interconnection point voltage that is detected by the interconnection point voltage detection device and is calculated by simulation of the electric power conversion device according to the first embodiment.

Hereinafter, a result of Verification Experiment 1 will be described. In FIG. 11A, the horizontal axis represents time (s), the vertical axis represents a voltage value (P.U.), and a calculation result of a detected value of the interconnection point voltage V detected by the interconnection point voltage detection device 20 is shown. In FIG. 11A, a solid line 711 indicates a detected value of the interconnection point voltage V of the R-phase, a broken line 712 indicates a detected value of the interconnection point voltage V of the S-phase, and a dotted line 713 indicates a detected value of the interconnection point voltage V of the T-phase. From FIG. 11A, it could be confirmed that ripples do not exist in the detected value of the interconnection point voltage V of each of the phases, and the ripples can be suppressed by calculating a moving average of the detected voltage detected over a period of one cycle of a carrier wave and by setting the moving average as the detected value of the interconnection point voltage V.

Figure 11B:
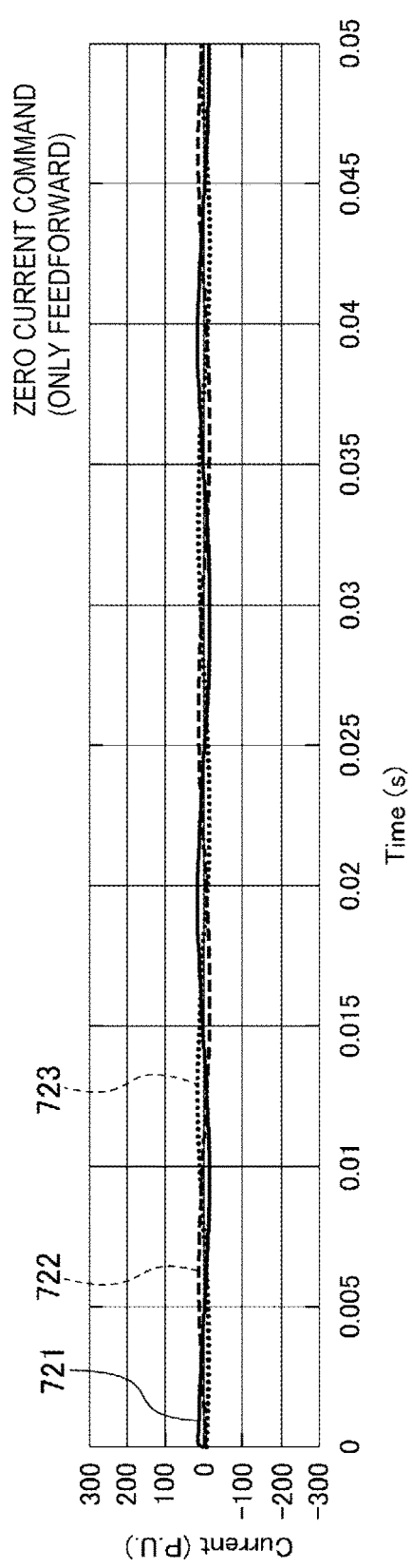
FIG. 11B is a graph showing an output current of the electric power conversion device in the case of only feedforward of the interconnection point voltage that is calculated by simulation of the electric power conversion device according to the first embodiment.

In FIG. 11B, the horizontal axis represents time (s), the vertical axis represents a current value (P.U.), and a calculation result of the output current of the electric power conversion device 10 in the case of only feedforward of the interconnection point voltage V is shown. In FIG. 11B, a solid line 711 indicates a calculated value of the R-phase current, a broken line 712 indicates a calculated value of the S-phase current, and a dotted line 713 indicates a calculated value of the T-phase current. From FIG. 11B, it could be confirmed that an output current of each phase is small, the detected value of the interconnection point voltage V follows the interconnection point voltage V, and thus detection delay of the interconnection point voltage V is suppressed. Accordingly, it could be confirmed that the electric power conversion device according to the invention can suppress ripples in a detected voltage and detection delay.

Verification Experiment 2

In Verification Experiment 2, as an example, the electric power conversion device according to Modification Example 4 of the second embodiment, which is provided with the control device 4000 illustrated in FIG. 5, is simulated, phase hit is caused to occur in the interconnection point voltage V during the simulation, variations in an output voltage, an output current, active power, and reactive current in the electric power conversion device were investigated to investigate robustness of the electric power conversion device. Simultaneously, as a comparative example, an electric power conversion device that controls an output by only vector control in the related art was simulated, and as in the example, variations in an output voltage, an output current, active power, and reactive power of the electric power conversion device with respect to phase hit of the interconnection point voltage were investigated to evaluate robustness. Results are shown in FIG. 12.

FIG. 12 A shows a temporal variation of the system voltage, a solid line 1201 indicates a voltage of the u-phase, a broken line 1202 indicates a voltage of the v-phase, and a dotted line 1203 indicates a voltage of the w-phase. FIG. 12 B shows a temporal variation of a phase angle. FIG. 12 C shows a control result of the example, that is, a temporal variation of an output current of the electric power conversion device of the example, a solid line 1211 indicates an output current to the u-phase, a broken line 1212 indicates an output current to the v-phase, and a dotted line 1213 indicates an output current to the w-phase. FIG. 12 D shows a temporal variation of an output current of the electric power conversion device of the comparative example, a solid line 1204 indicates an output current to the u-phase, a broken line 1205 indicates an output current to the v-phase, and a dotted line 1206 indicates an output current to the w-phase. FIG. 12 E shows a temporal variation of outputs of active power of the electric power conversion device of the example and the electric power conversion device of the comparative example, a dotted line indicates the example, and a solid line indicates the comparative example. FIG. 12 F shows a temporal variation of outputs of reactive power of the electric power conversion device of the example and the electric power conversion device of the comparative example, a dotted line indicates the example, and a solid line indicates the comparative example.

From FIG. 12 A, it can be seen that phase hit occurs in the system voltage in the vicinity of 0.075 seconds. According to this, a phase angle also varies (refer to FIG. 12 B). From FIG. 12 C, it can be seen that in the electric power conversion device of the example, the output current decreases in conformity to phase hit of the system voltage, and is restored without flowing of an overcurrent. On the other hand, from FIG. 12 D, it can be seen that in the electric power conversion device of the comparative example, even when phase hit occurs, the output current does not vary in conformity to phase hit, and a large current in comparison to a control target flows to each phase after passage of approximately 0.01 seconds, and thus an overcurrent flows to the electric power conversion device.

Figure 12A:
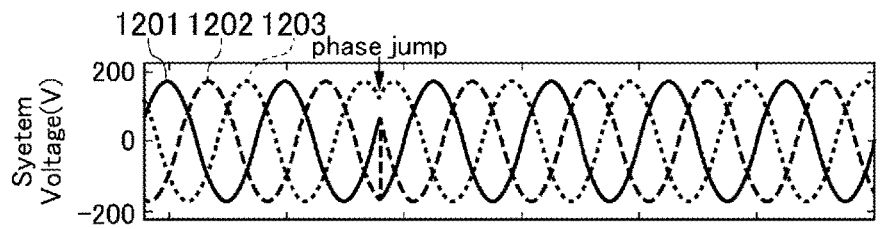
FIGS. 12A to 12F are graphs each showing a simulation result of an operation with respect to phase hit of a system voltage of an electric power conversion device according to the modification example of the second embodiment.
Figure 12B:
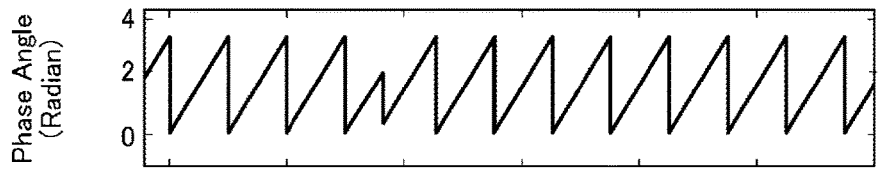
Figure 12C:
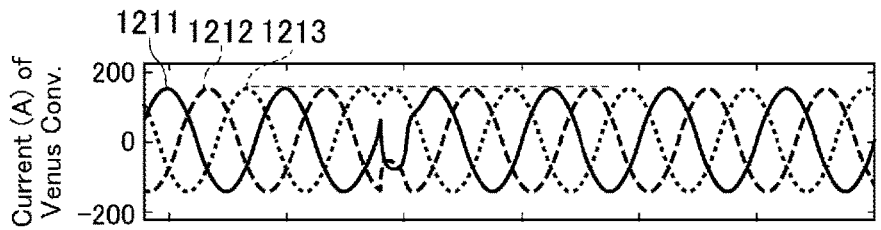
Figure 12D:
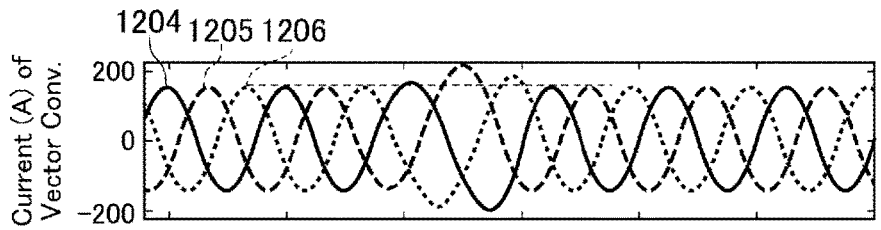
Figure 12E:
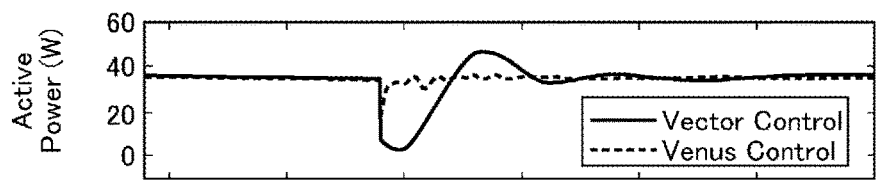
Figure 12F:
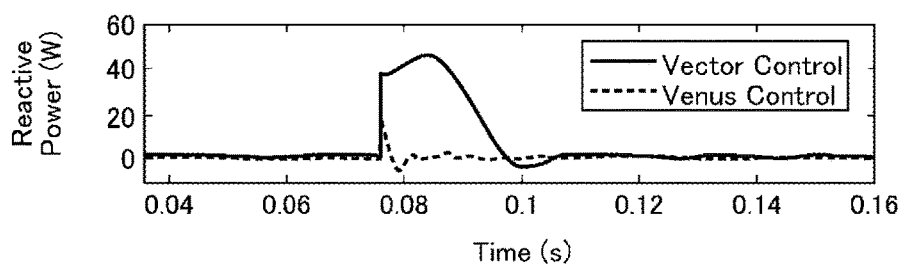

From FIG. 12 E and FIG. 12F, it can be seen that a variation amount of the output of the active power and the reactive power which varied due to phase hit is smaller in the example and an output early returns to a control target amount in comparison to the comparative example. As described above, it can be seen that robustness is higher in the electric power conversion device of Modification Example 4 of the second embodiment in comparison to the vector control in the related art.

Note that, in the above-described embodiments, description has been given of a case provided with the filtering unit 21 in which the output voltage of the detection unit is moving-averaged over a period of one cycle of constant cycles or an approximate value of the moving average is calculated by a voltage detector that is a voltage detection device, but the invention is not limited thereto. For example, a filtering unit, which moving-averages the output voltage of the detection unit or calculates an approximate value of the moving average over a period of several cycles of constant cycles (that is, more than one cycle of the constant cycles), may be provided in the voltage detector that is the voltage detection device.

In addition, in the above-described embodiments, description has been given of a case where the interconnection point voltage detection device 20 (system voltage detection device) calculates a moving average of a detected voltage over a period of one cycle of a carrier wave used in pulse width modulation control, and detects the moving average as the system voltage, but the invention is not limited thereto. For example, the interconnection point voltage detection device 20 (system voltage detection device) may calculate the moving average of the detected voltage over a period of several cycles of a carrier wave (that is, more than one cycle of the carrier wave) used in pulse width modulation control, and the moving average may be detected as the system voltage.

In addition, in the above-described embodiments, as a converter in which a switch is switched at a predetermined switching cycle, and power is output to the power system through the interconnection impedance, description has been given of the converter 11 in which a switch is switched to output pulses having different widths at an approximately constant cycle, and a predetermined AC voltage is output, but various cycles may be applied as the switching cycle (a cycle of the carrier wave used in pulse width modulation control) of the converter.

However, it is preferable that the switching cycle of the converter is a frequency of 13 kHz or higher exceeding an audible range.

As described above, the embodiments relate to the electric power conversion device 10 or 10a including the converter 11 of which a switch is switched at a predetermined switching cycle, and which outputs power to the power system 50 through the interconnection impedance (the reactors 17R, 17S, and 17T), the voltage detector (interconnection point voltage detection device 20) that detects a voltage of the interconnection point (terminal LPR, LPS, or LPT) with the power system 50 of the electric power conversion device 10, and the control device 30, 4000, or 60 that controls the converter 11 on the basis of the output voltage of the voltage detector which is moving-averaged over a predetermined period in correspondence with the switching cycle. According to this configuration, the electric power conversion device and the power generation system which are capable of suppressing ripples in the detected voltage and the detection delay are realized.

In addition, in the control device 4000 of the electric power conversion device, a value of a real number multiple of the output voltage of the voltage detector which is moving-averaged over a predetermined period in correspondence with the switching cycle may be set as an active current command value, and the converter 11 may be controlled by a voltage command value calculated on the basis of the active current command value.

In addition, in the control device 4000 of the electric power conversion device, instantaneous voltage (active component voltage estimation value Vi_d or reactive component voltage estimation value Vi_q) may be calculated from instantaneous formulae of Expression (2) and Expression (3), or instantaneous formulae of Expression (4) and Expression (5), on the basis of the output voltage of the voltage detector which is moving-averaged over a predetermined period in correspondence with the switching cycle, and the voltage command value of the converter 11 may be generated from the instantaneous voltage.

In addition, in the control device 4000 of the electric power conversion device, the above-described configurations may be combined, for example, a value of a real number multiple of the output voltage of the voltage detector which is moving-averaged over a predetermined period in correspondence with the switching cycle may be set as a current command value, instantaneous voltage (active component voltage estimation value $Vi\_d$ or reactive component voltage estimation value $Vi\_q$) may be calculated from instantaneous formulae of Expression (2) and Expression (3), or instantaneous formulae of Expression (4) and Expression (5) on the basis of the current command value, and the voltage command value of the converter 11 may be generated from the instantaneous voltage.

In addition, description has been given of a case where measurement is performed by the interconnection point voltage, but other sites of the power system instead of the interconnection point may be used as long as impedance from the converter can be estimated.

In addition, a voltage of another point, for example, interconnection impedance may be measured, and the interconnection point voltage may be obtained through operation or the like without directly measuring the interconnection point voltage.

REFERENCE SIGN LIST

10, 10*a*, 10*b*: Electric power conversion device
11: Converter
15: Active power source
17R, 17S, 17T: Reactor
20, 25: Interconnection point voltage detection device
30, 60, 4000: Control device
50: Power system
55: AC voltage source
70: Voltage compensation unit
100, 100*a*, 100*b*: Electric power generation system

The invention claimed is:

1. An electric power conversion device configured to be connected to a power system through interconnection impedance, comprising:
   a converter of which a switch is switched at a predetermined switching cycle, and which outputs power to the power system through the interconnection impedance;
   a voltage detector that detects an interconnection point voltage between the electric power conversion device and the power system; and
   a control device that controls the converter on the basis of a moving average of an output voltage of the voltage detector over a predetermined period in correspondence with the switching cycle,
   wherein the control device sets an active current command value equal to a result from multiplying the output voltage by a real number.

2. The electric power conversion device according to claim 1,
   wherein the control device calculates an instantaneous voltage on the basis of the output voltage, and generates a voltage command value of the converter from the instantaneous voltage.

3. An electric power generation system comprising:
   the electric power conversion device according to claim 1.

4. An electric power conversion device configured to be connected to a power system through interconnection impedance, comprising:
   a converter of which a switch is switched at a predetermined switching cycle, and which outputs power to the power system through the interconnection impedance;
   a voltage detector that detects an interconnection point voltage between the electric power conversion device and the power system; and
   a control device that controls the converter on the basis of a moving average of an output voltage of the voltage detector over a predetermined period in correspondence with the switching cycle,
   wherein the control device sets a current command value equal to a result from multiplying the output voltage by a real number, calculates an instantaneous voltage on the basis of the current command value, and generates a voltage command value of the converter from the instantaneous voltage.

5. An electric power generation system comprising:
   the electric power conversion device according to claim 4.

6. An electric power conversion device configured to be connected to a system functioning as an AC voltage source through interconnection impedance, comprising:
   a converter that includes a switch that is switched to output pulses of different widths at approximately constant cycles, and outputs a predetermined AC voltage;
   a voltage detector that detects a system voltage of the system; and
   a control device that controls the converter,
   wherein the voltage detector includes a detection unit that detects a voltage value at a predetermined point of the system to which the converter is connected, and a filtering unit that computes a moving-average of an output voltage of the detection unit or calculates an approximate value of a moving average of the output voltage over a period of one cycle or several cycles of constant cycles, and
   the control device includes a voltage command value generation unit that adds at least one or more of an active power component voltage command value for outputting active power and a reactive power component voltage command value for outputting reactive power to the system voltage to calculate a voltage command value.

7. An electric power generation system comprising:
   the electric power conversion device according to claim 6.

8. An electric power conversion device configured to be connected to a power system through interconnection impedance, comprising:
   a converter that outputs a predetermined AC voltage;
   a system voltage detection device that detects a system voltage of the power system; and
   a control device that controls the converter by pulse width modulation control,
   wherein the system voltage detection device detects the system voltage by calculating a moving average over a period of one cycle or several cycles of a carrier wave used in the pulse width modulation control with respect to a detected voltage,
   the control device has a function of calculating a voltage command value of the converter on the basis of the system voltage which is calculated by a moving-average computation, and
   the control device includes a voltage command value generation unit that adds at least one or more of an active power component voltage command value for outputting active power and a reactive power component voltage command value for outputting reactive power to the system voltage to calculate a voltage command value.

9. The electric power conversion device according to claim 8,
wherein the control device
sets the system voltage multiplied by a real number as the reactive power component voltage command value, and
has a function of calculating the active power component voltage command value with the system voltage set as the current command value.

10. The electric power conversion device according to claim 8,
wherein the control device has a function of calculating the active power component voltage command value by time-differentiating the system voltage.

11. The electric power conversion device according to claim 8,
wherein a phase of the active power component voltage command value shifts from the system voltage by a quarter period.

12. The electric power conversion device according to claim 8,
wherein the control device includes a differential operation unit that calculates the active power component voltage command value by time-differentiating a voltage obtained by dividing the system voltage by an interconnection impedance value.

13. The electric power conversion device according to claim 8,
wherein the control device has a function of calculating the reactive power component voltage command value and the active power component voltage command value by time-differentiating the system voltage.

14. The electric power conversion device according to claim 8,
wherein the control device includes an active component operation unit that calculates the active power component voltage command value by time-differentiating an active current command effective value calculated on the basis of the system voltage multiplied by a real number.

15. The electric power conversion device according to claim 14,
wherein the active component operation unit includes a differential operation unit that differentiates the active current command effective value, and adds a product of the differentiated active current command effective value and an inductance value of the interconnection impedance and a product of the active current command effective value and a resistance value of the interconnection impedance to calculate the active power component voltage command value.

16. The electric power conversion device according to claim 14,
wherein the control device includes a voltage compensation value operation unit that calculates a voltage compensation value for compensating the active current command effective value on the basis of the system voltage and a rated phase voltage of the power system.

17. The electric power conversion device according to claim 8,
wherein the control device includes a reactive component operation unit that calculates the reactive power component voltage command value by time-differentiating a reactive current command effective value calculated on the basis of the system voltage in which a phase is advanced by 90°, which is calculated by rotating a phase by 90° by using a rotation matrix after three-phase/two-phase conversion, and further performing two-phase/three-phase conversion.

18. The electric power conversion device according to claim 17,
wherein the reactive component operation unit includes a differential operation unit that differentiates the reactive current command effective value, and adds a product of the differentiated reactive current command effective value and an inductance value of the interconnection impedance and a product of the reactive current command effective value and a resistance value of the interconnection impedance to calculate the reactive power component voltage command value.

19. The electric power conversion device according to claim 17,
wherein the control device includes a voltage compensation value operation unit that calculates a voltage compensation value for compensating the reactive current command effective value on the basis of the system voltage and a rated phase voltage of the power system.

20. The electric power conversion device according to claim 8,
wherein a current command value is set equal to a result from multiplying the system voltage by a real number.

21. The electric power conversion device according to claim 8, further comprising:
a differential operation unit that calculates a product of a differential value or an inexact differential value of the system voltage multiplied by a real number and an inductance value of the interconnection impedance.

22. The electric power conversion device according to claim 8, further comprising:
a differential operation unit that calculates a product of a differential value or an inexact differential value of the system voltage which is multiplied by a real number and in which a phase is advanced by 90° or delayed by 90°, and an inductance value of the interconnection impedance.

23. An electric power generation system comprising:
the electric power conversion device according to claim 8.

24. An electric power conversion device configured to be connected to a power system through interconnection impedance, comprising:
a converter that outputs a predetermined AC voltage;
a system voltage detection device that detects a system voltage of the power system; and
a control device that controls the converter by pulse width modulation control,
wherein the system voltage detection device detects the system voltage by calculating a moving average over a period of one cycle or several cycles of a carrier wave used in the pulse width modulation control with respect to a detected voltage,
the control device has a function of calculating a voltage command value of the converter on the basis of the system voltage which is calculated by a moving-average computation, and
the control device is a vector control unit that calculates the voltage command value by vector control on the basis of the system voltage.

25. The electric power conversion device according to claim 24,
wherein a current command value is set equal to a result from multiplying the system voltage by a real number.

26. The electric power conversion device according to claim 24, further comprising:
a differential operation unit that calculates a product of a differential value or an inexact differential value of the system voltage multiplied by a real number and an inductance value of the interconnection impedance.

27. The electric power conversion device according to claim 24, further comprising:
a differential operation unit that calculates a product of a differential value or an inexact differential value of the system voltage which is multiplied by a real number and in which a phase is advanced by 90° or delayed by 90°, and an inductance value of the interconnection impedance.

28. An electric power generation system comprising:
the electric power conversion device according to claim 24.

29. An electric power conversion device configured to be connected to a power system through interconnection impedance, comprising:
a converter that outputs a predetermined AC voltage;
a system voltage detection device that detects a system voltage of the power system; and
a control device that controls the converter by pulse width modulation control,
wherein the system voltage detection device detects the system voltage by calculating a moving average over a period of one cycle or several cycles of a carrier wave used in the pulse width modulation control with respect to a detected voltage,
the control device has a function of calculating a voltage command value of the converter on the basis of the system voltage which is calculated by a moving-average computation, and
the electric power conversion device further comprising:
a voltage compensation unit that calculates a peak value of the system voltage, and adds a difference between a rated voltage of the power system and the peak value to the system voltage to compensate a difference between the system voltage and the rated voltage.

30. The electric power conversion device according to claim 29,
wherein a current command value is set equal to a result from multiplying the system voltage by a real number.

31. The electric power conversion device according to claim 29, further comprising:
a differential operation unit that calculates a product of a differential value or an inexact differential value of the system voltage multiplied by a real number and an inductance value of the interconnection impedance.

32. The electric power conversion device according to claim 29, further comprising:
a differential operation unit that calculates a product of a differential value or an inexact differential value of the system voltage which is multiplied by a real number and in which a phase is advanced by 90° or delayed by 90°, and an inductance value of the interconnection impedance.

33. An electric power generation system comprising:
the electric power conversion device according to claim 29.

34. An electric power conversion device configured to be connected to a system functioning as an AC voltage source through interconnection impedance, comprising:
a converter that includes a switch that is switched to output pulses of different widths at approximately constant cycles, and outputs a predetermined AC voltage;
a voltage detector that detects a system voltage of the system; and
a control device that controls the converter,
wherein the voltage detector includes a detection unit that detects a voltage value at a predetermined point of the system to which the converter is connected, and a filtering unit that computes a moving-average of an output voltage of the detection unit or calculates an approximate value of a moving average of the output voltage over a period of one cycle or several cycles of constant cycles,
the control device has a function of calculating a voltage command value of the converter on the basis of the system voltage which is calculated by a moving-average computation, and
a current command value is set equal to a result from multiplying the system voltage by a real number.

35. An electric power generation system comprising:
the electric power conversion device according to claim 34.

36. An electric power conversion device configured to be connected to a system functioning as an AC voltage source through interconnection impedance, comprising:
a converter that includes a switch that is switched to output pulses of different widths at approximately constant cycles, and outputs a predetermined AC voltage;
a voltage detector that detects a system voltage of the system; and
a control device that controls the converter,
wherein the voltage detector includes a detection unit that detects a voltage value at a predetermined point of the system to which the converter is connected, and a filtering unit that computes a moving-average of an output voltage of the detection unit or calculates an approximate value of a moving average of the output voltage over a period of one cycle or several cycles of constant cycles, and
the electric power conversion device further comprising:
a differential operation unit that calculates a product of a differential value or an inexact differential value of the system voltage multiplied by a real number and an inductance value of the interconnection impedance.

37. An electric power generation system comprising:
the electric power conversion device according to claim 36.

38. An electric power conversion device configured to be connected to a system functioning as an AC voltage source through interconnection impedance, comprising:
a converter that includes a switch that is switched to output pulses of different widths at approximately constant cycles, and outputs a predetermined AC voltage;
a voltage detector that detects a system voltage of the system; and
a control device that controls the converter,
wherein the voltage detector includes a detection unit that detects a voltage value at a predetermined point of the system to which the converter is connected, and a filtering unit that computes a moving-average of an output voltage of the detection unit or calculates an approximate value of a moving average of the output voltage over a period of one cycle or several cycles of constant cycles, and the electric power conversion device further comprising:
a differential operation unit that calculates a product of a differential value or an inexact differential value of the system voltage which is multiplied by a real number and in which a phase is advanced by 90° or delayed by 90°, and an inductance value of the interconnection impedance.

39. An electric power generation system comprising:
the electric power conversion device according to claim 38.

* * * * *